United States Patent
Verma et al.

(10) Patent No.: US 7,418,463 B2
(45) Date of Patent: Aug. 26, 2008

(54) TRANSACTIONAL FILE SYSTEM

(75) Inventors: Surendra Verma, Bellevue, WA (US); Thomas J. Miller, Bellevue, WA (US); Robert G. Atkinson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 11/010,820

(22) Filed: Dec. 13, 2004

(65) Prior Publication Data

US 2005/0138085 A1    Jun. 23, 2005

Related U.S. Application Data

(62) Division of application No. 09/539,233, filed on Mar. 30, 2000, now Pat. No. 6,856,993.

(51) Int. Cl.
*G06F 17/30* (2006.01)
(52) U.S. Cl. ......................... 707/202; 707/203; 707/204
(58) Field of Classification Search ................. 707/202, 707/203, 204; 711/161, 162, 165, 155; 714/20
See application file for complete search history.

(56) References Cited

U.S. PATENT DOCUMENTS

| | | | |
|---|---|---|---|
| 4,224,665 A * | 9/1980 | de Bijl et al. ............... | 710/5 |
| 5,201,044 A | 4/1993 | Frey | |
| 5,715,441 A | 2/1998 | Atkinson et al. ............ | 707/1 |
| 5,774,667 A | 6/1998 | Garvey | |
| 5,813,016 A * | 9/1998 | Sumimoto .................. | 707/201 |
| 5,819,020 A * | 10/1998 | Beeler, Jr. ................. | 707/204 |
| 5,832,508 A | 11/1998 | Sherman | |
| 5,857,204 A * | 1/1999 | Lordi et al. ................ | 707/202 |
| 5,864,849 A | 1/1999 | Bohannon | |
| 5,870,757 A * | 2/1999 | Fuller ........................ | 707/201 |
| 5,878,434 A * | 3/1999 | Draper et al. ............... | 707/202 |
| 5,897,638 A * | 4/1999 | Lasser et al. ............... | 707/102 |
| 5,907,848 A * | 5/1999 | Zaiken et al. ............... | 707/202 |

(Continued)

OTHER PUBLICATIONS

"Read-Only Transactions in a Distributed Database"—Hector Garcia-Molina and Gio Wiedhold, ACM—Transactions on Database Systems (TODS)—vol. 7, Issue 2- Jun. 1982, (pp. 209-234).*

(Continued)

*Primary Examiner*—Jean Bolte Fleurantin
*Assistant Examiner*—Anh Ly
(74) *Attorney, Agent, or Firm*—Workman Nydegger

(57) ABSTRACT

A transactional file system wherein multiple file system operations may be performed as a transaction. An application specifies that file system-related operations are to be handled as a transaction, and the application is given a file handle associated with a transaction context. For file system requests associated with a transaction context, a file system component manages the operations consistent with transactional behavior. The component provides data isolation by providing multiple versions of a file by tracking copies of changed pages, such that transactional readers do not receive changes to a file made by transactional writers, until the transactional writer commits the transaction and the reader reopens the file. The component handles namespace logging operations in a multiple-level log that facilitates logging and recovery. Page data is logged separate from the main log, with a unique signature that enables the log to determine whether a page was fully flushed to disk.

10 Claims, 22 Drawing Sheets

U.S. PATENT DOCUMENTS

| | | | | |
|---|---|---|---|---|
| 5,909,540 | A * | 6/1999 | Carter et al. | 714/4 |
| 5,956,731 | A | 9/1999 | Bamford et al. | |
| 5,960,194 | A * | 9/1999 | Choy et al. | 707/102 |
| 5,960,436 | A * | 9/1999 | Chang et al. | 707/202 |
| 5,991,771 | A * | 11/1999 | Falls et al. | 707/202 |
| 6,009,405 | A | 12/1999 | Leymann | |
| 6,014,674 | A | 1/2000 | McCargar | |
| 6,021,414 | A * | 2/2000 | Fuller | 707/202 |
| 6,029,160 | A * | 2/2000 | Cabrera et al. | 707/1 |
| 6,035,379 | A * | 3/2000 | Raju et al. | 711/162 |
| 6,078,999 | A * | 6/2000 | Raju et al. | 707/202 |
| 6,189,100 | B1 * | 2/2001 | Barr et al. | 713/182 |
| 6,192,365 | B1 * | 2/2001 | Draper et al. | 707/101 |
| 6,199,068 | B1 * | 3/2001 | Carpenter | 707/100 |
| 6,205,449 | B1 | 3/2001 | Rastogi | |
| 6,205,475 | B1 * | 3/2001 | Pitts | 709/218 |
| 6,275,953 | B1 * | 8/2001 | Vahalia et al. | 714/4 |
| 6,301,605 | B1 * | 10/2001 | Napolitano et al. | 709/201 |
| 6,321,234 | B1 | 11/2001 | Debrunner | |
| 6,374,268 | B1 * | 4/2002 | Testardi | 707/205 |
| 6,453,325 | B1 * | 9/2002 | Cabrera et al. | 707/204 |
| 6,453,334 | B1 | 9/2002 | Vinson | |
| 6,523,027 | B1 | 2/2003 | Underwood | |
| 6,549,916 | B1 * | 4/2003 | Sedlar | 707/200 |
| 6,710,786 | B1 * | 3/2004 | Jacobs et al. | 715/744 |
| 6,816,891 | B1 * | 11/2004 | Vahalia et al. | 709/214 |
| 6,856,993 | B1 * | 2/2005 | Verma et al. | 707/101 |
| 6,922,708 | B1 * | 7/2005 | Sedlar | 707/202 |
| 7,257,595 | B2 * | 8/2007 | Verma et al. | 707/101 |
| 2001/0016829 | A1 * | 8/2001 | Toshikage et al. | 705/26 |
| 2004/0088296 | A1 * | 5/2004 | Shaath et al. | 707/9 |
| 2005/0091287 | A1 * | 4/2005 | Sedlar | 707/200 |
| 2005/0120036 | A1 * | 6/2005 | Verma et al. | 707/100 |
| 2005/0120059 | A1 * | 6/2005 | Verma et al. | 707/200 |
| 2005/0149525 | A1 * | 7/2005 | Verma et al. | 707/8 |
| 2006/0253502 | A1 * | 11/2006 | Raman et al. | 707/202 |
| 2007/0038650 | A1 * | 2/2007 | Carley et al. | 707/100 |

OTHER PUBLICATIONS

"Implementing Distributed Read-Only Transactions"—Chan, A. and Gray. R IEEE Transactions on Software Engineering; vol. SE-11, No. 2, Feb. 1985, (pp. 205-212).*

Kroeger, R. et al., "The Relax Transactional Object Management System", International Workshop on Computer Architecture to Support Security and Persistence of Information, May 8, 1990, pp. 339-355, XP000619867.

Bayer R., et al, "Parallelism and Recovery in Database Systems", ACM Transactions on Database Systems, Jun. 1980, vol. 5, No. 2, pp. 139-156, XP002198393.

Gray, Jim et al., "Transaction Processing: Concepts and Techniques", Transaction Processing: Concepts and Techniques, 1993, pp. 724-732, XP002194027.

Brown, Mark R., "The Alpine File System", ACM Transactions on Computer Systems, Association for Computing Machinery, New York, vol. 3, No. 4, Nov. 1, 1985, pp. 261-293, XP000039672.

Braban, Bruno et al., A Well Structured Parallel File System for PM:, Operating Systems Review (SIGOPS), ACM Headquarters, New York, vol. 23, No. 2, Apr. 1, 1989, pp. 25-38 XP000140479.

Office Action mailed Feb. 22, 2007 cited in related U.S. Appl. No. 11/009,228.

Office Action mailed Aug. 1, 2007 cited in related U.S. Appl. No. 11/009,228.

Office Action mailed May 29, 2007 cited in related U.S. Appl. No. 11/009,662.

* cited by examiner

TRANSACTIONAL FILE SYSTEM

CROSS REFERENCE TO RELATED APPLICATION

This is a divisional of U.S. patent application Ser. No. 09/539,233 filed Mar. 30, 2000.

FIELD OF THE INVENTION

The present invention is directed generally to computers and file systems.

BACKGROUND OF THE INVENTION

Typical file-systems provide mechanisms to manipulate a file-hierarchy, including the creation of new files or directories, the deletion or renaming of files or directories, and the manipulation of file contents. Certain file systems provide certain guarantees about the completion of a single low-level operation, i.e., primitive. For example, the primitive to create a new file will either complete successfully, or any partial effects of that create file operation will be undone by the system.

However, multiple file system operations at the user level may not be tied together within the file system. For example, there is presently no way for a file system to create four files, delete three others and rename another, but if any of these operations fail, undo any of the other operations. As a result, a higher-level (user level) process such as an application is employed to manage such multiple operations, i.e., to specify to the file system which actions are applied to which files and/or directories.

This solution has its own drawbacks, however. Consider an example wherein a web-site has twenty web pages linked to each other in a way that gives the site a consistent look and feel. During the updating of the site, the system may fail, causing an inconsistent state. For example, the application performing the update may have deleted some files but not the links from other files pointing to these files at the time of failure. A user viewing the site would see some of the web pages, but would receive error messages when clicking on the links to deleted pages.

To guard against the possibility of winding up in an inconsistent state, the entire web page file-hierarchy is ordinarily copied before any files in the hierarchy are changed. In the event of a failure, the saved hierarchy is copied back. However, this copying of the files is slow, relatively clumsy in that the copy program needs to know in advance what parts of the system are going to be updated, and error-prone, since if any file is inadvertently not copied, it is unrecoverable.

If the files are changed in place, when using a higher-level process to update files, any in-progress changes are visible to users viewing the site. For example, with the web-site described above, any changes are visible to the existing users of the system while the files (and the name hierarchy) are being changed by the application. Since the system-state is typically inconsistent until all the changes have been made, users may see the inconsistency. For example, an existing user may see a link (URL) in a web-page, click on it and end up on a page that has been deleted, an event which happens when the application has deleted a page but not yet removed the link that pointed to the page.

In addition to web page updating, other programs are similarly limited in their ability to consistently save information. For example, a typical word processor application or a spreadsheet application performs full saves by rename and delete operations, using temporary files in order to avoid inconsistent states which may occur following system failures. Such applications also may want to distribute information across different data sources. For example, an application may desire to store tabular data in SQL Server, and files in a file server and/or in an Internet server, e.g., such files may include word processor documents, presentation charts, and/or web pages. However, no mechanism presently exists to support the saving of such information in a coordinated, unified manner. For example, if the system fails during the saving of such information, some of the pieces of information will be saved, but others will not, again leading to an inconsistent state.

SUMMARY OF THE INVENTION

Briefly, the present invention provides a system and method via which multiple file system operations may be performed as part of a single user-level transaction. The transactional file system of the present invention enables a user to selectively control the scope and duration of a transaction within the file system.

During a file open or create, the application specifies whether the operations on that instance of the file open should be handled as part of a transaction. Additionally, the system provides a capability to persistently mark files that can only be manipulated transactionally, with the application specifying the transaction via a globally unique id (GUID) at the time of the open/create. For new file creations, the parent directory is marked as transacted, and the application may associate a transaction with a thread/process, whereby file operations by such threads/processes are transacted in the context of the specified transaction. Further, the application may choose to instruct the system (e.g., via an API) that child threads/processes inherit the transaction context, enabling applications to take advantage of transactions without any significant change to the application source code.

Once a file has been opened transactionally, the system automatically includes operations such as read, write, delete or rename on the file's handle as part of the transaction. As a result, applications can call existing file-system APIs, continue to see existing per-operation semantics, yet include the operations as part of a transaction. An application is free to use as many transactions it wishes to use, is free to share a transaction with other applications, have as many threads/processes share a transaction and so forth. The transaction may be specified on a file open done for a file that resides on a different machine.

Other aspects of the invention are directed to logging to enable the recoverability from a failed transaction. Under a transaction, changes made by the system are undone if the transaction fails for any reason, including system failure and application failure, and changes made by the system for that transaction are guaranteed to survive system failure (e.g., power outage) if the system successfully commits the transaction on behalf of the application. This is accomplished via a multiple-level logging mechanism and a mechanism that determines whether lower-level logged operations were successfully committed, thereby determining whether the higher level logged operations actually occurred.

Data changes are also logged by separating the operational events into one log and the actual data write details of the transaction into another log, e.g., a page stream. A mechanism writes and later compares a signature logged with both the logged record and the data to determine whether a logged record is synchronized with its corresponding data page, eliminating the requirement that the log be written to disk in a particular order with respect to the data.

Other aspects of the invention include providing namespace and file data isolation among transactions and other file system operations. Namespace isolation is accomplished by the use of isolation directories to track which names belong to which transaction. As a result, none of changes made by the system for a given transaction are visible to other transactions while the modifying transaction is still active, and only become visible after the modifying transaction successfully commits. Transaction unaware file-handles see the changes as they happen. Thus, a file deleted during the course of a first transaction will no longer be seen by that first transaction or non-transactions, but will remain visible to other transactions until the first transaction completes.

To accomplish such name space isolation, isolation directories are created that are linked to the original NTFS directories, with the appropriate file name added to the isolation directory instead of the normal NTFS parent directory. For example, for a delete operation, the name of the deleted file is added to the isolation directory at the same time as it is removed from the NTFS parent directory. Prior to commit, a subsequent access to this file by a different transaction is serviced using the isolation directory, whereby the file is found and considered not deleted. Similarly, if a transaction creates a file, the name is added to the NTFS directory as well as to an isolation directory linked to the parent NTFS directory. The transaction that created the file sees it, however for other transactions, the name is filtered out for the purposes of opening the file or listing the parent NTFS directory. Isolation directory entries are removed from the isolation directories when the transaction commits or aborts.

The present invention thus incorporates a transaction mechanism into the file system, enabling applications to easily perform multiple transactional operations to one or more files, overcoming the problems associated with external transaction mechanisms. In this manner, multiple file system operations are tied together in a transactional manner within the file system, such that the operations either are committed together, else any partial actions are undone. Moreover, the operations and data changes of one transaction are isolated from the operations and data of another transaction.

Other advantages will become apparent from the following detailed description when taken in conjunction with the drawings, in which:

DETAILED DESCRIPTION OF THE INVENTION

Exemplary Operating Environment

Figure 1:
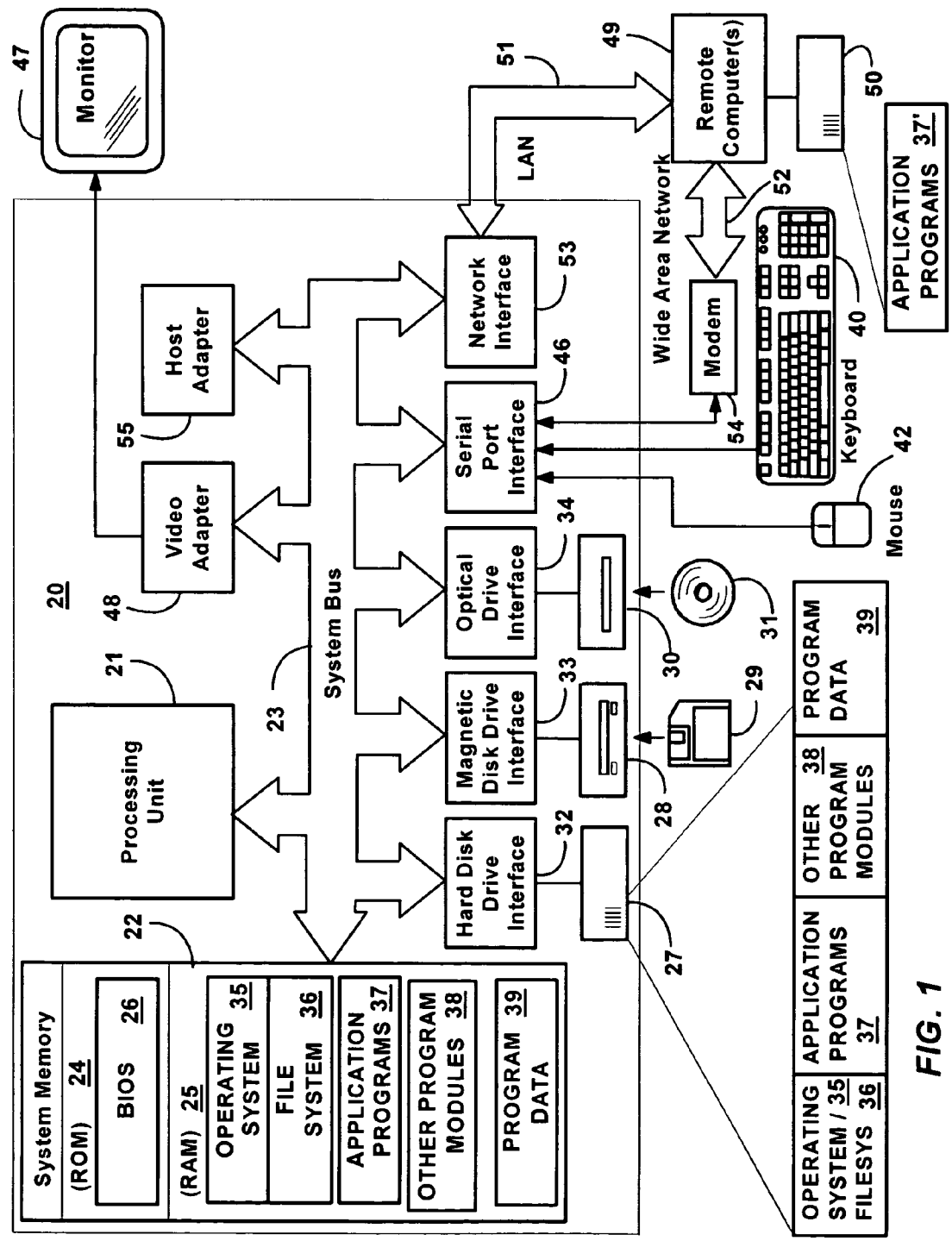
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Microsoft Corporation's Windows® 2000, formerly Windows® NT). The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While the present invention is described with respect to the Windows® 2000 operating system and the Microsoft Windows NT® file system (NTFS), those skilled in the art will appreciate that other operating systems and/or file systems may implement and benefit from the present invention.

The Transactional File System General Architecture

In general, as used herein the terms "transaction," "transactional," and so forth refers to operations having certain common properties, applied in the present invention to multiple file-system operations. The transactional properties are typically referred to as "ACID" properties, standing for atomicity, consistency, isolation and durability. As will be understood below, the present invention accomplishes these properties in association with a file system, providing numerous benefits to applications and computing in general.

Figure 2:
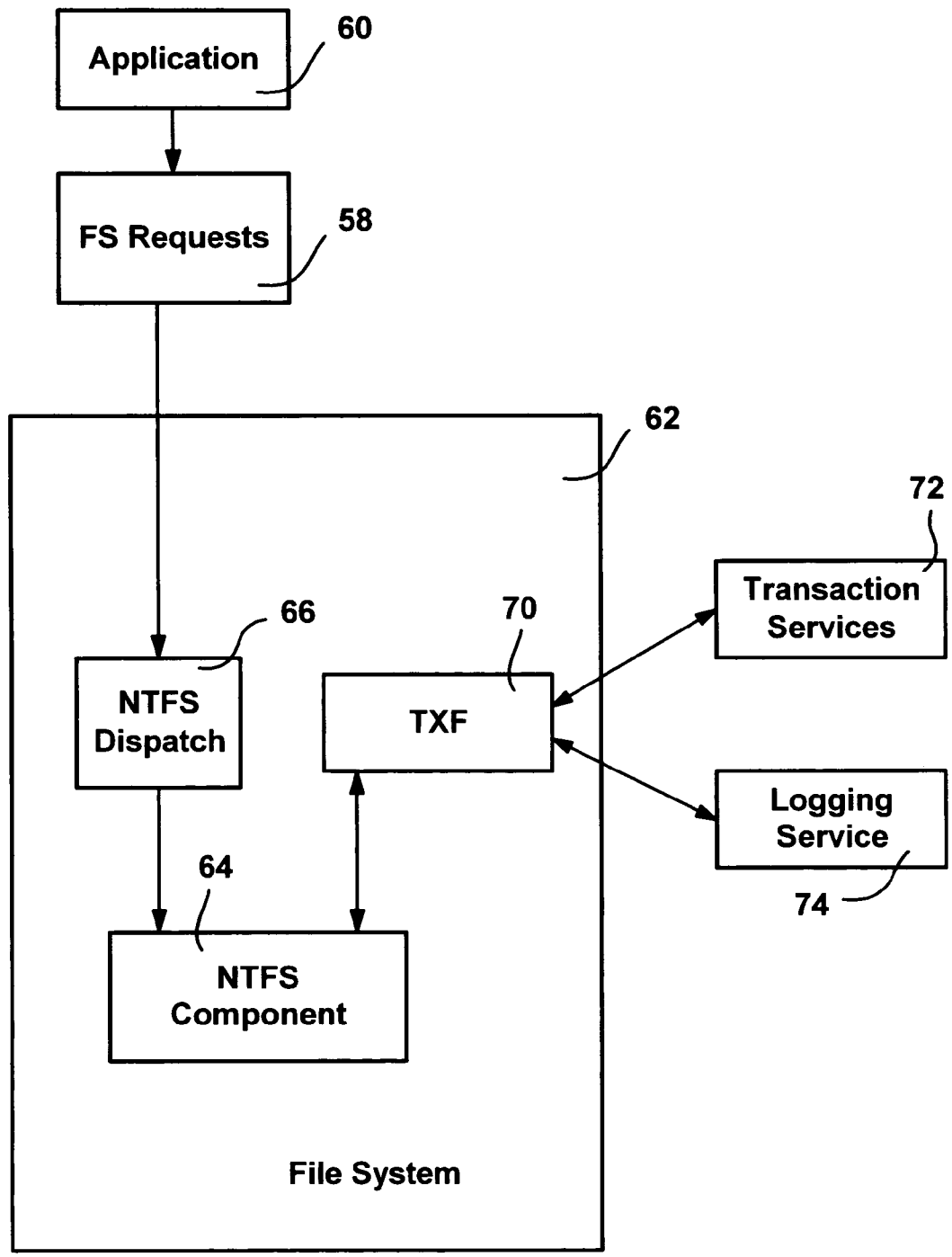
FIG. 2 is a block diagram representing a general architecture for implementing a transactional file system in accordance with one aspect of the present invention.

As generally represented in FIG. 2, file system requests 58 directed from an application 60 or the like to a transaction-enabled file system 62 (as described herein with respect to the present invention) such as the Microsoft Windows NT® file system (NTFS) 36 (FIG. 1), reach an NTFS component 64 via a dispatch mechanism 66. As is known with respect to conventional file systems, to generate these requests, which may, for example, result in I/O request packets (IRPs) being sent by an I/O manager to the file system, the application 60 may make application programming interface (API) calls. In accordance with the present invention and as described below, certain ones of the file system requests 58 may be associated with a transaction, while others may not be.

In the absence of transactions, file system requests 58 are dispatched and handled directly by the NTFS component 64, essentially in the same way as prior to the present invention. Similarly, requests 58 initiated by transactions or directed to files or directories that have been modified by open transactions, as described below, also continue to be dispatched normally to and from the NTFS component 64. However, such transactional requests result in callouts (callbacks) to a TxF component 70, such as implemented inside of the file system 62, at strategic points during the otherwise normal processing.

As shown in FIG. 2 and as described below, the TxF component 70 includes interfaces to external transaction services 72 and a Logging Service 74, and works with the NTFS component 64 to handle transactional requests. The external transaction services 72 may include Microsoft Corporation's Distributed Transaction Coordinator (MS DTC, or simply MTC or DTC), in which a client (e.g., the application 60) calls to initiate a transaction, and later calls to commit or abort the operation. DTC is well-documented, and will not be described in detail herein except for a brief summary, and to the extent that it works in conjunction with the TxF 70.

Figure 3:
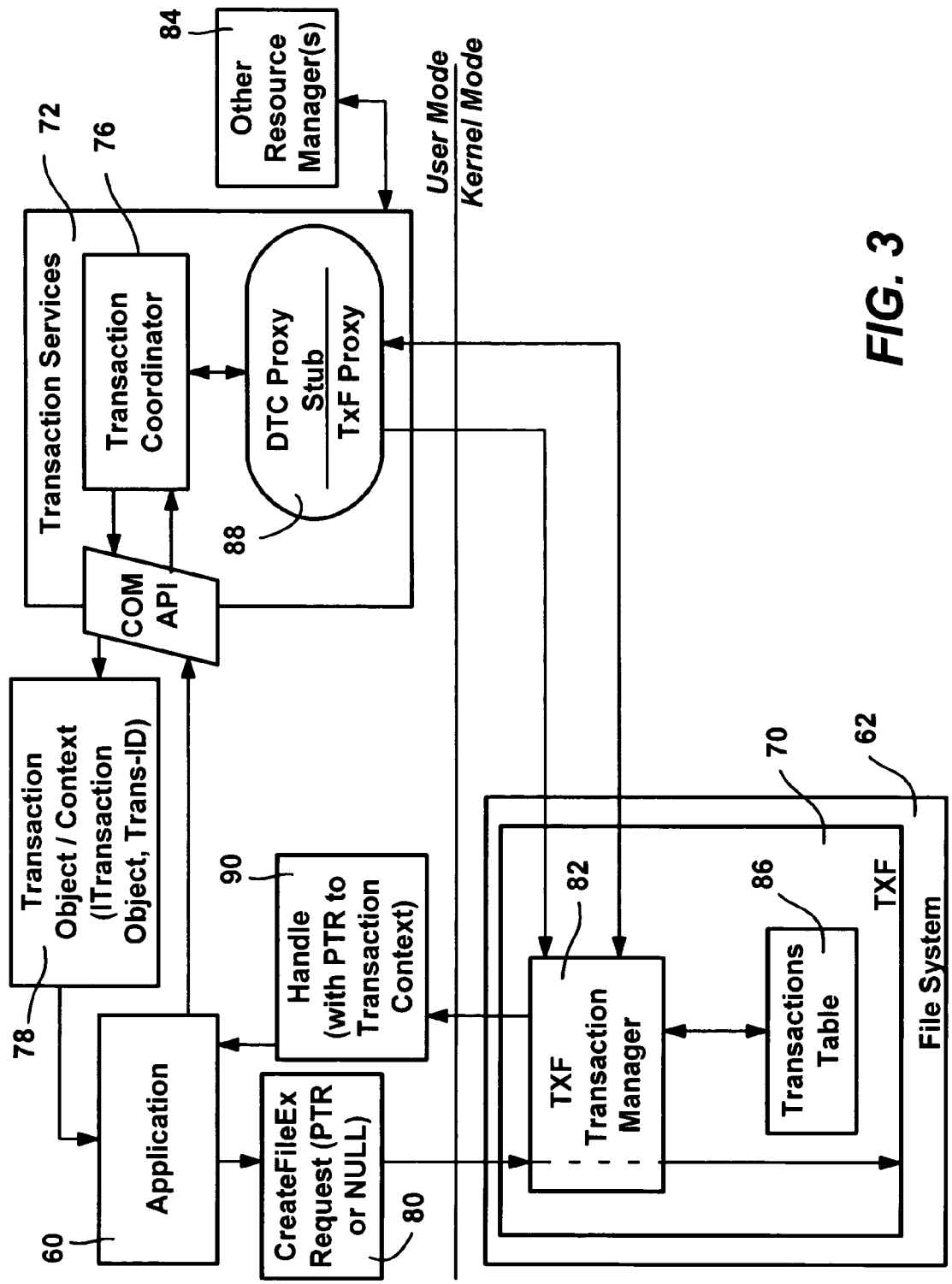
FIG. 3 is a block diagram representing a request for creating/opening a transacted file in accordance with one aspect of the present invention.

In general, and as represented in FIG. 3, in MS DTC, via COM/OLE, an application such as the application 60 initiates a transaction by calling a method of a transaction coordinator 76 (FIG. 3), i.e., the BeginTransaction method. The transaction coordinator 76 may be a transaction server in a network, or a local proxy thereof. This call creates a transaction object/context 78 that represents the transaction. The application 60 then calls one or more resource managers to do the work of the transaction. In the present invention, the TxF component 70 acts as the resource manager for transactional file system operations. As also represented in FIG. 3 and as described below, API calls (e.g., CreateFileEx 80 and other file system operations) to the file system 62 generate callouts to the TxF component 70.

The application's first call to the file system 62 identifies a file, a directory or the application's current thread/process, which may have the transaction context 78 associated therewith. If a transaction context is associated, the file system 62 calls out to the TxF 70. When the TxF 70 first performs work on behalf of a transaction, it enlists the transaction by calling the transaction coordinator 76, thereby informing the transaction coordinator 76 that the TxF 70 is a resource manager involved in this transaction. Note that other resource managers 84 (e.g., of a database component) may similarly enlist for this transaction, whereby the database's operations and the file system's operations can be committed (or aborted) together within the same transaction.

To determine when TxF 70 needs to enlist for a transaction, as generally represented in FIG. 3, using a transaction identifier (ID) that comes in with the ITransaction object 78, a transaction manager 82 layer of the TxF component 70 checks the ID against known enlisted transactions maintained in a transactions table 86 of transaction IDs. If already listed, the Transaction ID and Transaction reference are noted in the I/O Request Packet (IRP) and the IRP continues. The use of IRPs in NTFS is well documented, and is not described in detail hereinafter for purposes of simplicity. However, if the transaction is not listed in the table 86, TxF notifies the transaction coordinator 76 that TxF 70 is a resource manager that needs to be associated with this transaction, and stores the transaction identifier in the table of enlisted transactions 86.

More particularly, when the transaction is a new transaction not listed in the table 86, enlistment with the transaction coordinator 76 is required. To this end, the TxF manager 82 uses a proxy 88 to communicate with the transaction coordinator 76 using an OLE transactions or another protocol. Alternative protocols and the like that are suitable for use with the present invention include XA (of X/Open), TIP (Transaction Internet Protocol) and/or intrinsic transaction control within the operating system. The CreateFileEx 80 request marshals the ITransaction object 78 (e.g., via DTC ItransactionTransmitter method) into a flat collection of bytes. If enlistment is required, these bytes are sent to the proxy 88, which in turns calls a DTC ITransactionReceiver method to get the ITransaction object 78 back, which is needed for enlistment. The proxy 88 maintains the DTC objects ITransactionResourceAsync and ITransactionEnlistmentAsync. ITransactionResourceAsync implements the TxF callback routines that the transaction coordinator 76 calls to drive two-phase commit, and is supplied with the enlist call. ItransactionEnlistmentAsync is returned by IResourceManager::enlist( ) and contains the methods that TxF 70 calls to acknowledge two-phase commit controls. The proxy 88 acts as the intermediary between the methods in ItransactionResourceAsync and ItransactionEnlistmentAsync and the file system control (FSCTL)-based remote procedure calls (RPCs) for communicating between TxF component 82 and the proxy 88.

Note that it is feasible to have the TxF coordinator proxy run in the same process as the DTC coordinator process, and also to move the transaction manager into the kernel thereby eliminating process-switching overhead. The DTC proxy stub may also be moved into the kernel to eliminate the need for TxF work in building a user-mode proxy, and at the same time, eliminate the extra process switch from the TxF proxy into the transaction manager. The TxF proxy may be run in the same process as the DTC coordinator, which requires work by the TxF proxy, but it will have the same number of process switches as the previous solution.

Following enlistment, as the transaction progresses, the transaction coordinator 76 keeps track of each of the resource managers including TxF 70 (and possibly other resource managers 84, e.g., other TxFs or database resource managers) enlisted in the transaction. Note that this enables other information (e.g., database information) to be committed as part of a transaction that also commits file system information, and also, enables files of multiple transactionally-enabled file systems (e.g., on remote machines) to be committed as part of the same transaction.

Typically, the application 60 completes the transaction by calling (via COM) a Commit transaction method of the transaction coordinator 76 to commit the transaction. The transaction coordinator 76 then goes through a two-phase commit protocol to get each of the enlisted resource managers to commit. The two-phase commit protocol ensures that all the resource managers commit the transaction or all abort it. In the first phase, the transaction coordinator 76 asks each resource manager, including the TxF component 70, if it is prepared to commit. If the resource managers respond affirmatively, then in the second phase, the transaction coordinator 76 broadcasts a commit message to them. If any resource manager responds negatively, or fails to respond to the prepare request, and/or any part of the transaction fails, then the transaction coordinator 76 notifies the resource managers that the transaction aborted. Also, if the application is unable to complete, the application 60 calls the Abort transaction method. If the application fails, the transaction coordinator 76 aborts the transaction on the application's behalf. The various resources managers including TxF 70 then undo any partial actions, as described below.

The TxF component 70 thus acts as a resource manager in the context of standard transaction services (such as DTC), whereby true user-defined transaction support is extended to a file system. Note that NTFS allows TxF to link transient per-file and per-stream transaction state to the normal NTFS structures, as described below.

In accordance with one aspect of the present invention, the application 60 may choose to include file-system operations within a transaction. This can be accomplished per file, such that the file is marked as transacted and operations thereto are performed transactionally, or per thread/process, wherein the thread/process is marked as transacted, and operations done by that thread/process are performed transactionally.

To include a file in a transaction, a transacted mode flag (e.g., bit) is defined that can be used with a CreateFileEx application programming interface (API) call (described below), a variation of the CreateFile WIN32 API. When the flag is set, the system of the present invention automatically includes this file in a transaction context. To this end, as generally represented in FIG. 3, when a create request 80 comes into the file system (NTFS) 62 via an I/O request packet (IRP), an existing transaction context 78 may be attached to the request by passing a pointer to that context 78, whereby the file may be created/opened as part of the existing transaction context 78. Alternatively, if the pointer to Itransaction pointer is NULL in the CreateFileEx API call, the context is picked up off the thread automatically, as in Microsoft® Transaction Server (MTS)/Component Object Model (COM) model. The file handle 90 returned in response to a successful create/open request 80 will include a pointer to the transaction context 78. Thereafter, calls made with that handle 90 are recognized via the pointer as having a transaction context associated therewith, from which the relevant transaction is identified, and file system operations using that handle are performed on behalf of the transaction until the transaction is ended.

The CreateFileEx API is a proper superset of the existing CreateFile Win32 API, and adds a "dwAdditionalFlags" DWORD parameter to take the flag "FILE_FLAG_TRANSACTED" to set the transaction mode. Also defined is the parameter that may point to a transaction context object, LPUNKNOWN punkTransaction, wherein if NULL, as described above, the object is picked up from the current MTS/COM context.

To mark a thread/process as transacted, a SetTransactedFiles API is provided, which effectively treats a set of CreateFile/CreateFileEx calls as if they have the transacted mode flag set. If a particular CreateFileEx specifies a non-null ITransaction object pointer, that object is used for the transaction context 78, otherwise the MTS transaction object is picked up off the thread.

The SetTransactedFiles API is used to mark the thread/process as transacted, whereby any file-system access via that thread/process is transacted. Three different flags can be set, namely a flag that when set causes any file-system access from the current thread to be made transacted, a flag that when set causes any file-system access from each of the threads in the current process to be made transacted, and a flag that when set causes child processes spawned from the current process to have the second and third of these flags set. Thus, it is possible to mark the thread/process in a way that spawned processes inherit this mode, a mechanism which is very powerful, as it allows existing applications to make use of transacted NTFS. In addition, it allows applications to do file-system operations like deleteFile and copyFile which do not have a transacted mode bit. This feature can also be used to allow transacted command line batch scripts. The following describes the SetTransactedFiles API:

```
SetTransactedFiles(
    [in] DWORD dwMode,    // zero or more values from the enumeration
                          // TxFILEMODE. This value contains the new
                          // settings for the flags which are to be
                          // set as indicated by the dwMask parameter.
    [in] DWORD dwMask,    // zero or more values from the enumeration
                          // enumeration TxFILEMODE. Only the values of
                          // those flags which are present in this mask
                          // are affected by the SetTransactedFiles
                          // invocation.
    [out] DWORD* pdwPrevMode // Optional. If provided,then through
                          // here, the previous mode is returned
                          // to the caller.
    );
The legal flag values are as follows:
    Enum TxFILEMODE
    {
        TxFILEMODE_THISTHREAD      = 0x00000001,  // for the current thread
        TxFILEMODE_ALLTHREADS      = 0x00000002,  // for all threads in the
                                                  // the process
        TxFILEMODE_CHILDPROCESSES  = 0x00000004,  // Makes all child
                                                  // processes spawned from
                                                  // the current process
                                                  // while the mode is set
                                                  // automatically have the
                                                  // flags ___ALL THREADS and
                                                  // _CHILDPROCESSES set
        TxFILEMODE_ALL             = 0xFFFFFFFF
    };
```

Figure 4:
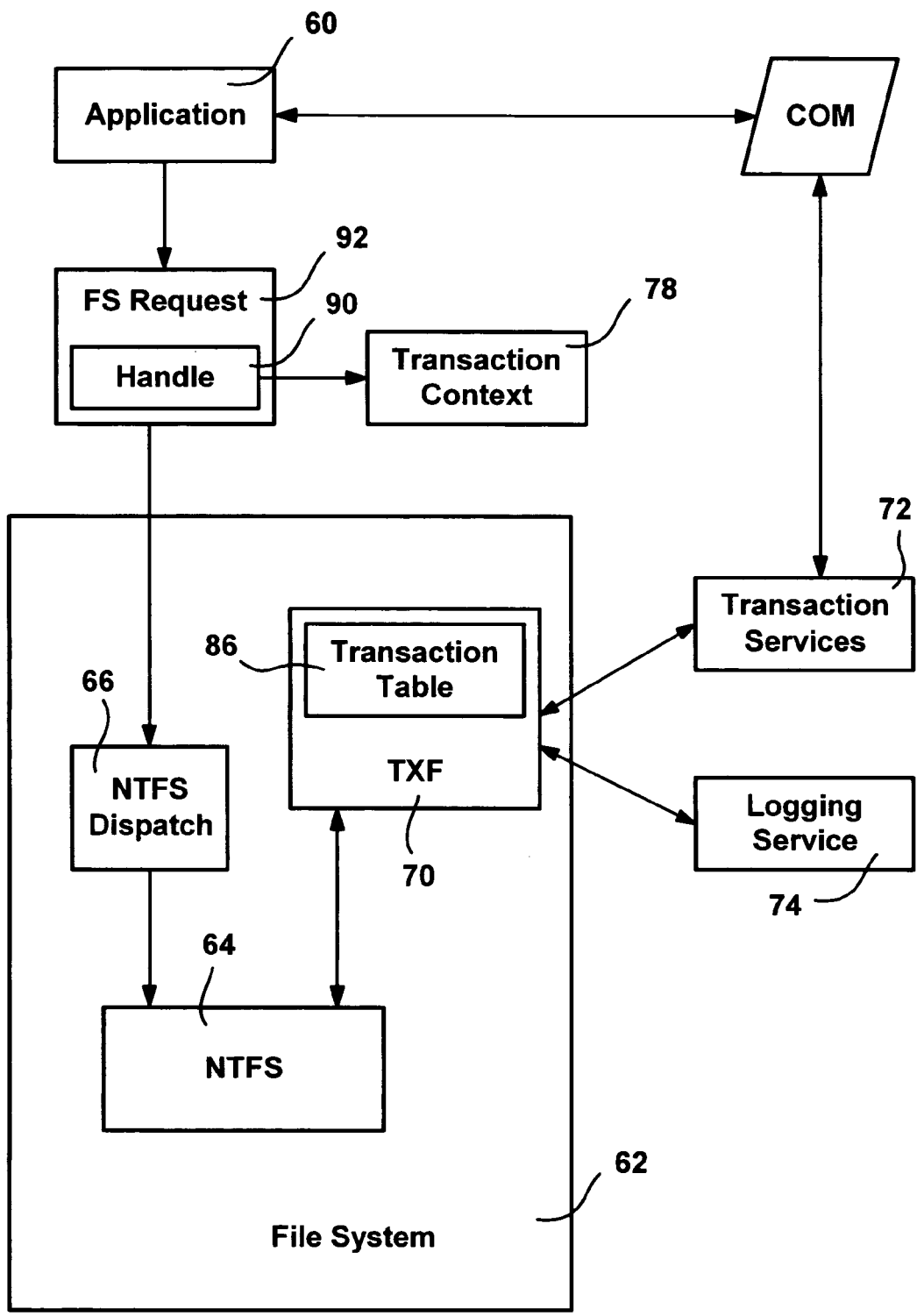
FIG. 4 is a block diagram representing a request for performing a file system operation on an open transacted file in accordance with one aspect of the present invention.

As shown in FIG. 4, for file operations other than create/open, the application 60 provides the handle 90 to the file system, e.g., via an API call 92 requesting a file read operation, whereby via the transaction context pointer therein, the file system can locate the transaction context. Note that TxF 70 may have to enlist the transaction, as described above. Because of the transaction context pointed to in the file handle 90, the file system knows that this operation is included in a transaction, as well as the identifier of the particular associated transaction. Including a file in the transaction context means operations on the file will be transacted, including reads, writes, file creation and deletion. An arbitrary number of file system requests may be grouped within a single transaction, and committed or aborted atomically and durably. Moreover, an arbitrary number of transactions may be ongoing at any moment, each isolated from one another.

Transactional Access—Read and Write Isolation

As described above, files can be opened or created for transacted access. At present, in order to provide a straight-forward, safe, and predictable behavior, the system limits the number of updater (writer) transactions in the system to one at any given time, i.e., an error is returned at file open time if multiple transactions attempt to open the file concurrently for read/write (RW) access. Thus, these restrictions are placed at the file level (as opposed to the stream level). This restriction stays with the file, until the later of the commit or abort.

However, it is alternatively feasible to implement a system with finer granularity, e.g., the file may be opened by multiple writers but no one may overwrite another's written to (dirty) page in the file, i.e., once a page is dirty, that page is locked. Also, a "last-writer-wins" type of access may be implemented herein. Note that these types of file "write" access are not mutually exclusive in a given system, as it is feasible to have one API open a file for write access that locks the entire file, another API open a file (not the locked file at the same time)

for write access with per page (or other file section) locking, and/or another API with last-writer-wins write access. For purposes of simplicity herein, however, the present invention will be described such that the entire file may be opened only once at a given time (i.e., others are serialized) for read/write access by a transaction. Non-transactional updaters of the file are also serialized with a transactional open for write. Note that this does not prevent multiple threads belonging to the same transaction from opening the file concurrently for writing. No significant restriction is placed on the number of readers that may open a file, i.e., with read-only access.

Figure 5:
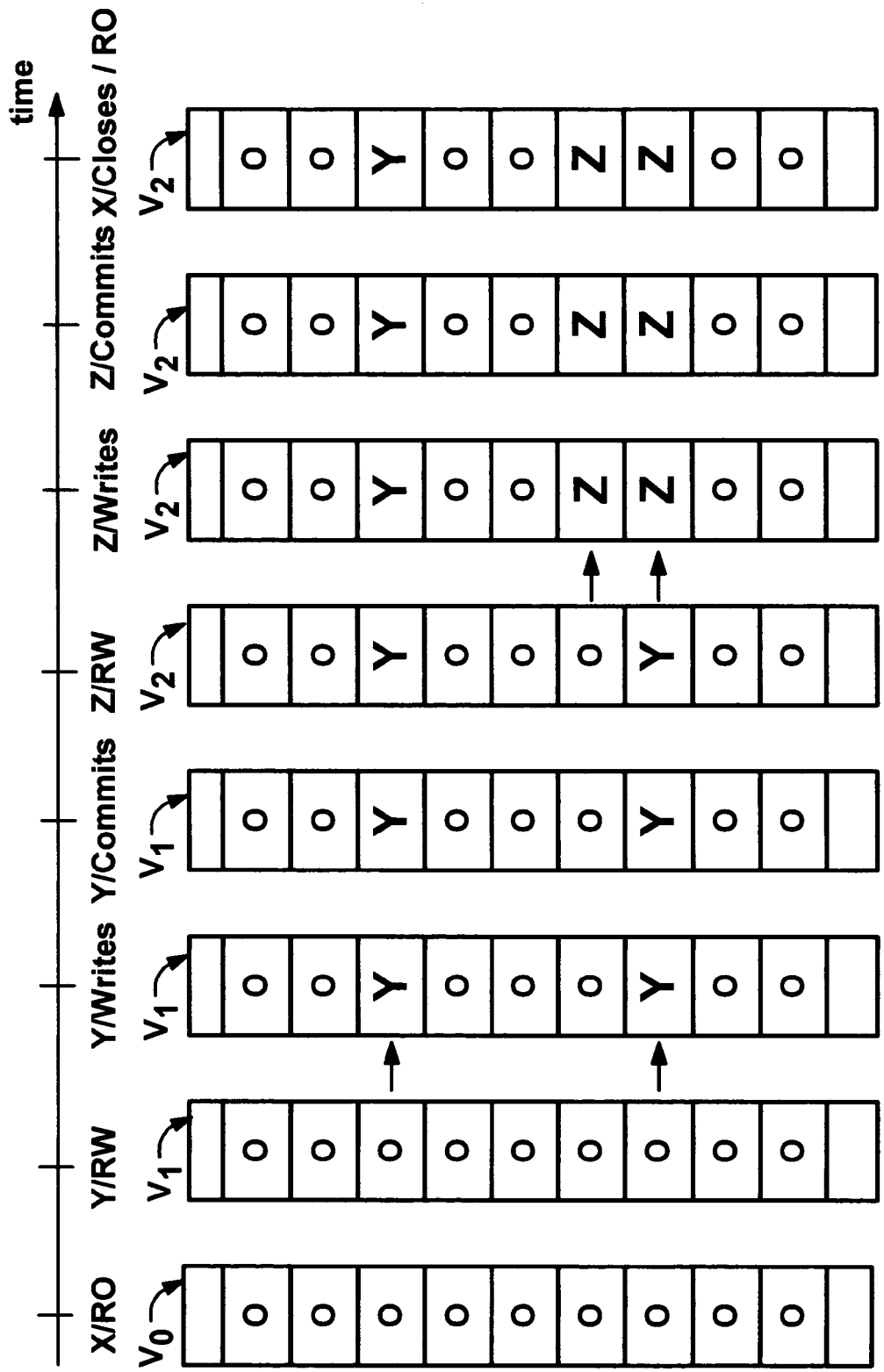
FIG. 5 is a block diagram representing isolation of transacted files over a period of time in accordance with one aspect of the present invention.

In keeping with the present invention, a file opened for read access by one transaction is isolated from simultaneous changes made to the file by another transaction, regardless of whether the writer opened the file before or after the reader. Moreover, the isolation continues until the read-only transaction's access is ended, regardless of whether the transaction that has changed the file commits the transaction. For example, as shown in FIG. 5, consider a transactional reader X opening a file $V_0$ of pages for read-only access, represented in FIG. 5 by X/RO at the start of the timeline. Note that the capital "O" in each page in the file represents the original data at the time of open. If writer Y later in time opens the file $V_1$ for read/write access (Y/RW) in another transaction, and then makes changes thereto (Y/Writes), transactional reader X will continue to see the original data in file $V_0$, not writer Y's changes in $V_1$. Note that non-transactions will see the file changes as they occur.

To accomplish transactional isolation, as described below, a "version" $V_0$ of the file is kept for reader X, for (at least) the time the reader X has the file open. This remains true even if transactional writer Y commits. Note that writer Y makes the changes in the file itself, and the version seen by reader X is a per-page copy of the original data made before the changes are written, as described in more detail below, although the opposites is feasible, i.e., keep the original file intact for reader x and keep a version of the changed pages for writer Y. Also, note that as used herein, the terms "version," "versioned" "versioning" and the like refer to a point in time snapshot, (and should not be confused with persistent versioning such as in a source code control system). Further, note that a transactional reader may be serialized with a non-transactional writer to facilitate implementation. Alternatively, the non-transactional writer may be included in a "system-owned" transaction for isolation purposes only. Predictable transactional read semantics are thus provided, whereby the transacted reader may rely on a "frozen" image of the file at a given point in time.

Figure 9:
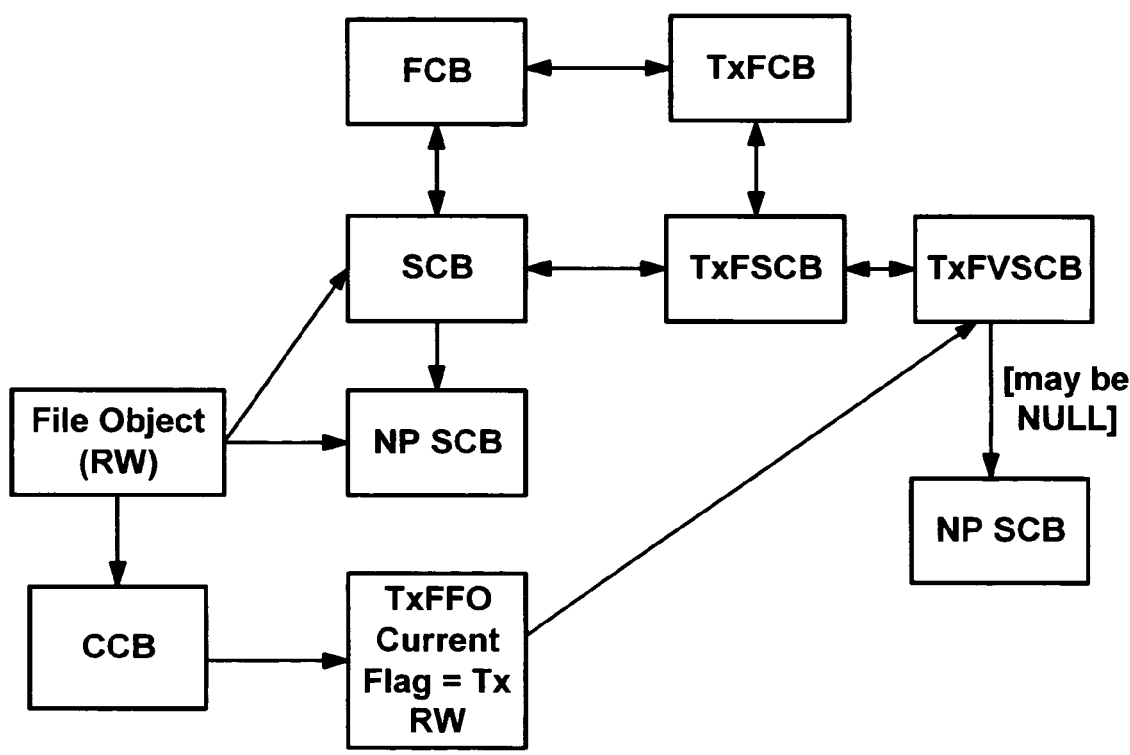
FIGS. 9-10 are block diagrams representing the relationships between data structures for supporting isolation of files opened for read and write access in a transaction in accordance with one aspect of the present invention.

Returning to FIG. 5, once transactional writer y commits file $V_1$, transactional writer Z may open the file $V_2$ (unchanged from $V_1$) for read-write access (Z/RW), as represented in FIG. 9. Writer Z will see writer Y's committed changes, and can make further changes thereto (Z writes). Note however that at this time, reader X continues to see the original file pages that X saw when the file was first opened by X, and not any of Y's committed changes. Only if reader X closes the file, and then reopens, will reader X possibly see writer Y's changes. Reader X may also see writer Z's committed changes, provided that reader X closes and reopens the file $V_2$ after Z commits, as shown in FIG. 5. In other words, if reader X closes and reopens before Z commits, reader X will see version $V_1$, however if reader X closes and reopens after Z commits, reader X will see file version $V_2$. Note that as described below, it is alternatively feasible to maintain and enable the opening of versions that are older than the most-recently committed version at the time of the open.

It should be noted that these semantics are not expressible using any existing file-sharing modes. The transaction isolation semantics described herein isolate the effects of transactions from one another, as opposed to the file sharing modes that isolate handles from one another. The existing file-sharing modes are not changed, and may be used for additional serialization. For example, in the case of an open for transactional update by two different threads of the same transaction that specify "deny-write" file-sharing mode, the second open will be denied with a sharing violation. This allows a distributed application to allocate a transaction workload to multiple threads, processes, or machines, while at the same time protecting the changes made by the transaction from other transactions or non-transacted workers. Moreover, these semantics guarantee a predictable versioned read in which each reader can rely on the contents of a file to remain stable while kept open.

In the compatibility matrix set forth below, a "Yes" means modes are compatible with respect to the additional transactional restrictions:

|  | Trans Reader | Trans Reader/ Writer | Non-Trans Reader | Non-Trans Reader/ Writer |
| --- | --- | --- | --- | --- |
| Trans Reader | Yes | Yes | Yes | No/Yes (optional) |
| Trans Reader/Writer | Yes | No | Yes | No |
| Non-Trans Reader | Yes | Yes | Yes | Yes |
| Non Trans Reader/Writer | Yes | No | Yes | Yes |

Thus, the updating transaction views the most recent version of the file that includes its changes, while transacted reads get a committed version of the file. One alternative, (the one generally described above), is to provide the most recently-committed version of the file at the time of open, and while it is open for transactional reading, not allow the version to change as more changes are made and committed. The advantage of this is that the reader gets to see a transactionally consistent view of the data for the duration of the open.

In a second alternative, the version seen by a reader may be the version at first file-system access or some other earlier time (i.e., an earlier point in a TxF log). This may provide the most-recently committed version at the time when this reader started. This start time may be the time when the transaction first accessed any NTFS object in the system, or alternatively the time may be defined using other APIs in an integrated scenario (e.g., using a log sequence number, or LSN). The advantage of this feature is that a transaction gets a point-in-time snapshot across multiple files, which may be useful when there are multi-file dependencies and links (e.g., HTML or XML files). Note that in this alternative, multiple opens of a file within the same transaction may get the version chosen at the first open within that transaction. However, as can be appreciated, the amount of version history that needs to be maintained by the system increases with this second alternative.

The term "version window" describes the time period during which the set of previous committed versions are maintained to support the chosen versioning scheme. For the first alternative described above, the version window varies by each file, and is the time between the oldest open of the file that is still active until the current time. For the second scheme, the window is defined as the time between the start LSN of the oldest transaction in the system until the current time. One or both of these schemes may be supported, and the work done by the TxF 70 to maintain versions is essentially the same. For purposes of simplicity, the present invention will be primarily described herein with respect to the first scheme, wherein the version seen by a reader is the most recently-committed version of the file at the time of the first open in the transaction. Thus, in this first scheme, since stream versions are decided at open time, an application will need to close and reopen handles if it desires the most recently committed data. This is likely to be particularly relevant in a web-server scenario, where the web-site may be updated online transactionally, and thus the readers will need to close and reopen handles to see the newly committed state.

In one implementation, writes to a file are to the actual file, since it is presumed that the changes will eventually be committed by the writer. If not committed, any changes are rolled back, via undo information captured in the log, as described below. Thus, to provide version isolation, each write directed to a page first results in the old page being preserved for transactional readers. Note however that it is feasible to do this in reverse, i.e., leave the original file intact until the changes are committed, whereby the writer rather than the reader would have new pages created therefor.

In a preferred implementation using the Microsoft Windows® 2000 (or NT®) operating system, instead of creating separate files on the disk for older versions, separate in-memory streams are presented from the point of view of the cache-manager and the virtual memory manager, or VMM. The cache manager, VMM and their relationship to non-transactional NTFS are further described in the references, *"Inside Windows NT®,"* by Helen Custer, Microsoft Press (1993); *"Inside the Windows NT® File System,"* Helen Custer Microsoft Press (1994) and *"Inside Windows NT@, Second Edition"* by David A. Solomon, Microsoft Press (1998), hereby incorporated by reference herein.

From the perspective of the virtual memory manager and the cache manager with respect to maintaining versions for transactional readers, reading an older version of a file is managed like reading a different file. This allows applications to simply map older versions in their address space, and also allows clients that access the data using memory descriptor lists (e.g., the redirector) to operate transparently. Note that this is possible because in the Windows® 2000 operating system, the VMM and the cache manager participate in file system input/output (I/O). File systems (except for files opened for non-cached access) use the cache manager to map the data into the system memory, and the cache manager in turn uses the VMM to initiate I/Os. Dirty page writes typically happen in background threads in a deferred mode. As a result of this architecture, files that are mapped directly in the application address space share the pages with the cache manager, which provides a consistent view of the data regardless of what system services are used to get at it. Note that as a result, network redirectors (described below) cache data locally, as well as get at the data at the server consistently with the other clients.

To accomplish isolation, multiple versions are maintained starting with the oldest committed version still being read to the latest version being updated. Each version has data structures associated with the version that track the changes therein relative to the latest version. If a page is read that is unchanged, the page is read from the file, (which may be in the cache or written to disk) while if a page is read that is changed, it is read from the changed page data (which also may be in the cache). Note that some of the versions may not have any transactions reading them, but their in-memory structures may be maintained because they are in a version-window, and may, in the future, get an open request. Such versions that have never been opened do not occupy any memory for storing data pages. The latest version corresponds to the base file stream, and may be updated.

Figure 6:
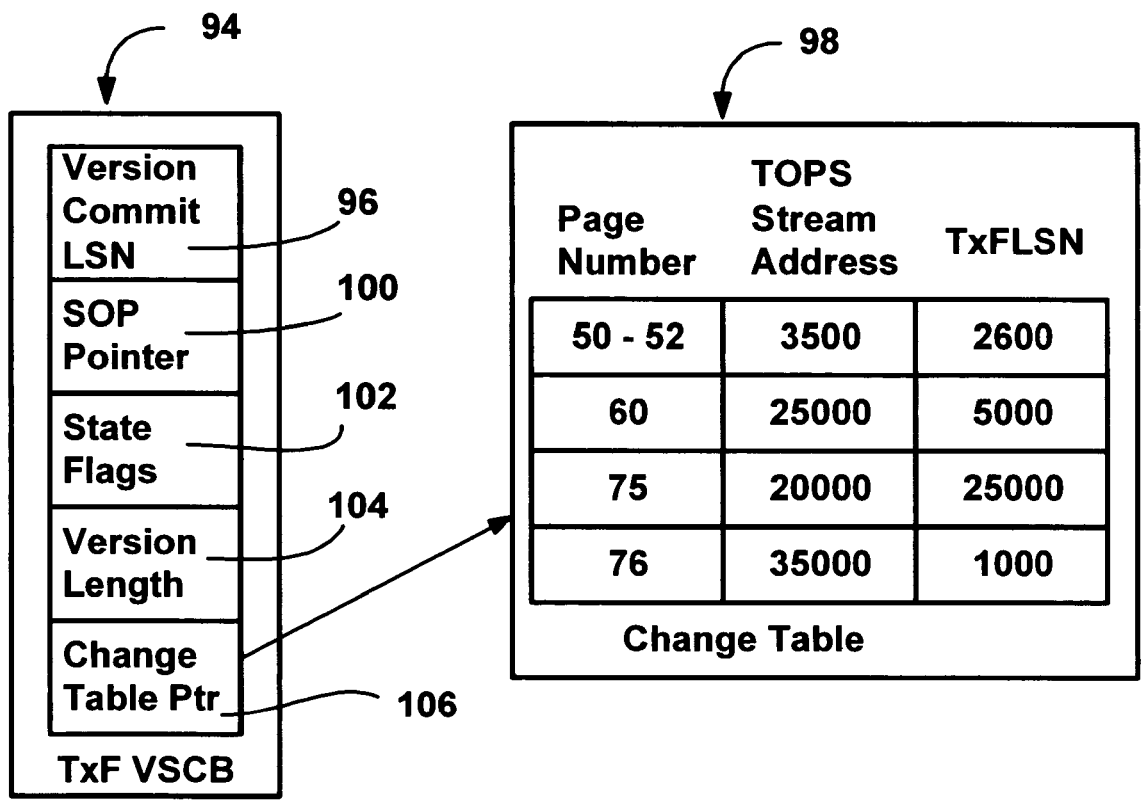
FIG. 6 is a block diagram representing data structures for tracking file versions in accordance with one aspect of the present invention.

As shown in FIG. 6, each version is described by a TxF "Version Stream Control Block" (TxFVSCB). The Version Stream Control Blocks for a file are linked in a list in time order, and each version other than the newest one is committed/aborted and read-only. The newest one may or may not be committed.

Each TxFVSCB (e.g., 94) includes a version log sequence number 96 (Version LSN) that stores the commit LSN of the transaction, as recorded in the TxF log. For the (most recent) uncommitted version, in one implementation, this LSN is a TxF-defined "MAX_LSN," e.g., to facilitate finding the highest LSN that is less than a current point in time. A reader that wants to read committed data that is earlier than this version can access it by using entries in a change table (e.g., $98_1$), which is an in-memory table 98 that records the page numbers changed by the version pointed to by the TxFVSCB. Each TxFVSCB such as the TxFVSCB 94 also includes a Section Object Pointers (SOP) structure 100 corresponding to this version, which is used by the cache manager and the virtual memory manager, and represents an in-memory stream. State flags 102 are also provided, one of which indicates whether the version is committed or not. Note that only the newest version can be uncommitted. Also included is a Version-Length 104 data field, along with a Change Table Pointer field 106, which includes the pointer to the change table 98 that records the page numbers changed by the version.

Figure 7:
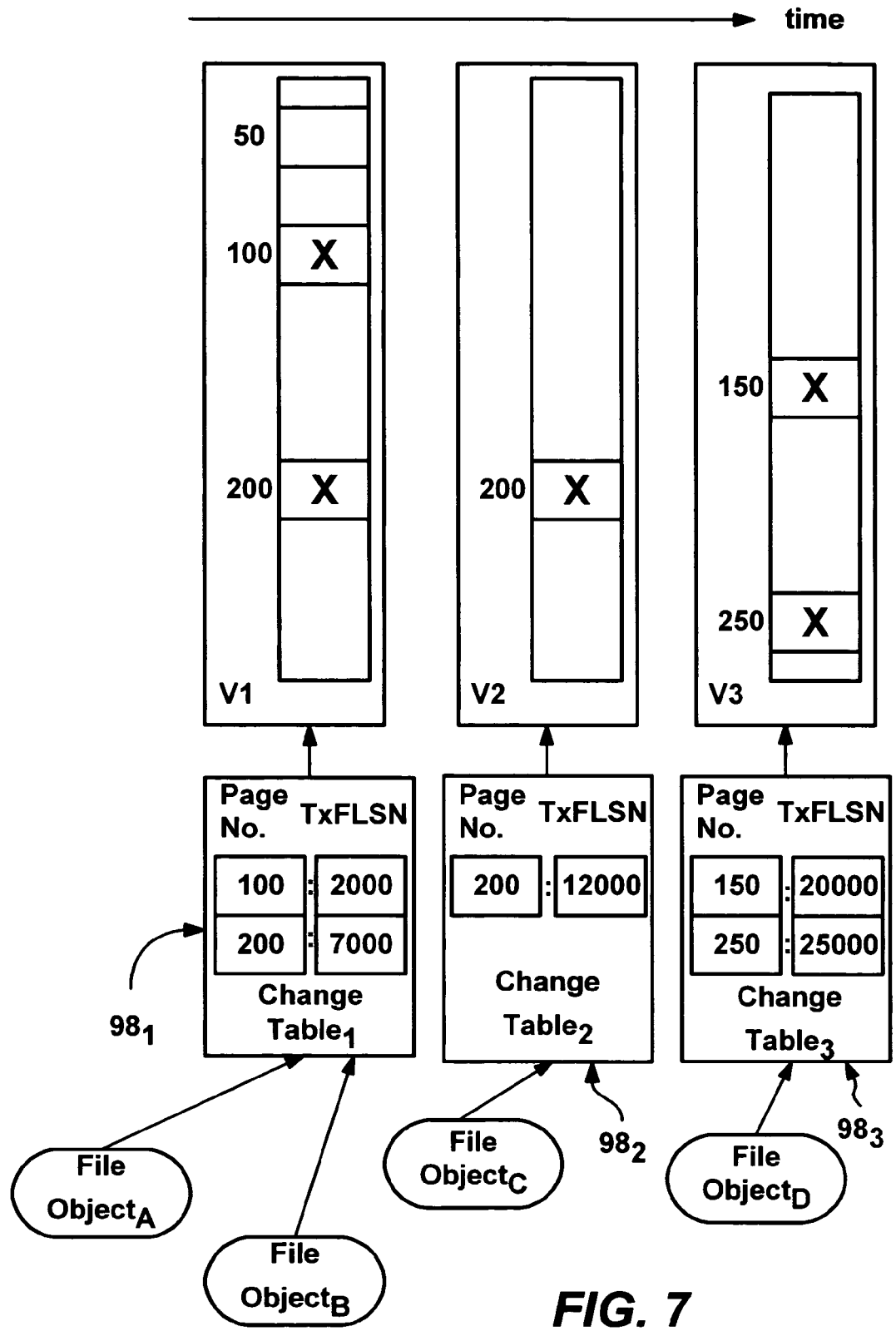
FIG. 7 is a block diagram representing a plurality of file versions maintained over time in accordance with one aspect of the present invention.

As represented in FIG. 6, in the change table, (e.g., $98_1$), a disk address may be stored in association with the page number to find the previous version of the page on the disk, provided the page has been written at least once in this version. Note that as shown in FIG. 6, primarily in order to save memory, page-ranges may be stored in an entry where pages are stored contiguously on disk. FIG. 7 shows the change tables $94_0$-$94_3$ for multiple versions of a file. An efficient search structure, such as a tree, may be used to organize the change table.

If the file is opened within a transaction for read-only access, a suitable committed version is picked. The version number is identified by the "readLSN." The readLSN is either the current LSN or is an older LSN, depending on which type of versioning is used, as described above. The version that is chosen is the last committed version before readLSN. If such a version does not exist, e.g., the version is too old, the open is failed. If the file does not have any TxFVSCBs associated with it, a new TxFVSCB is created with an empty change table, and is marked uncommitted. The default in-memory stream is used, so that existing cached data can be used for the read. For write access, if the latest version is uncommitted, it is used as is, else if not marked uncommitted, a new VSCB is created and marked as uncommitted.

Figure 8:
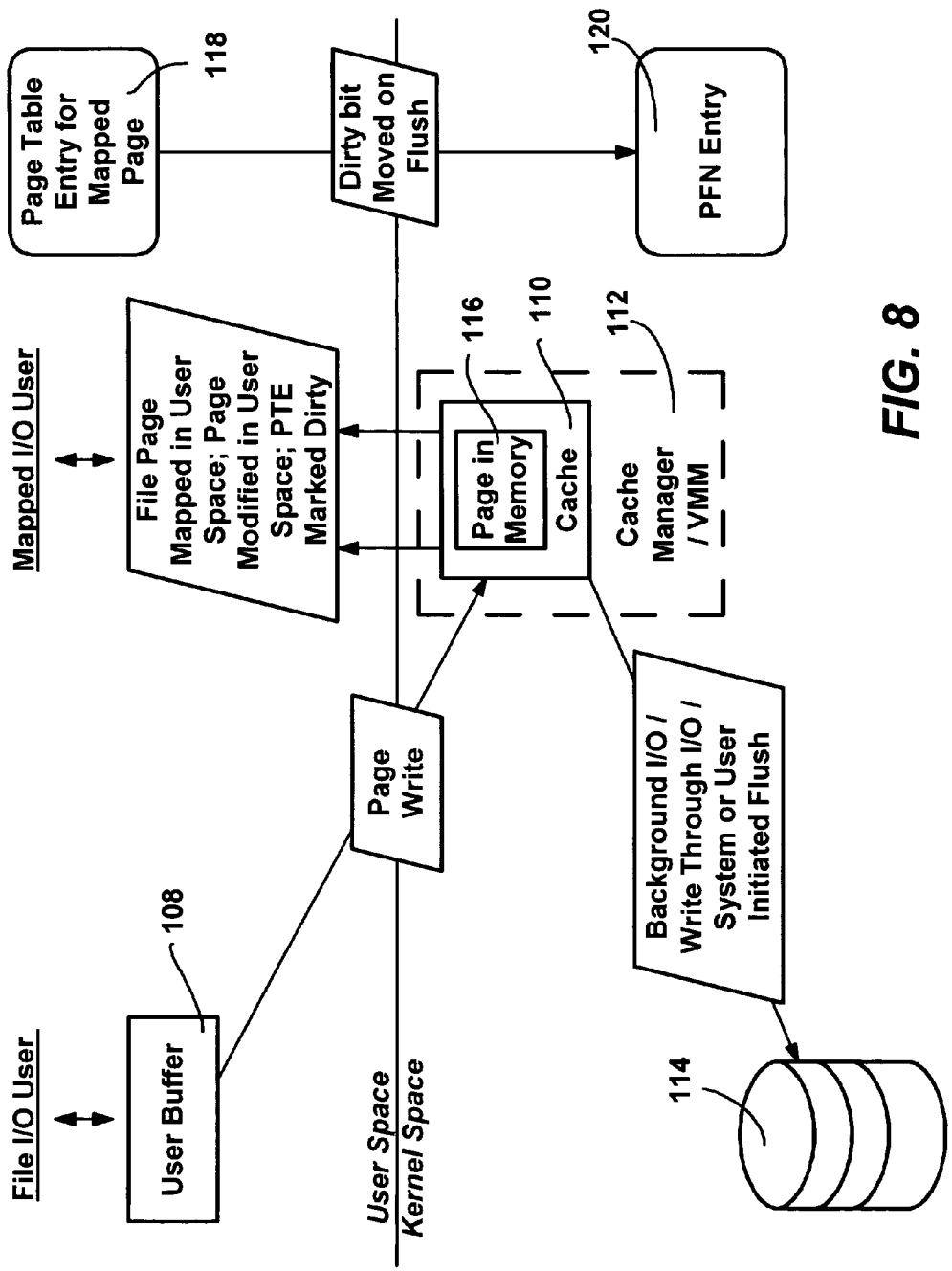
FIG. 8 is a block diagram representing a page of data of a file opened transactionally being written.

To facilitate isolation when writing to a file, each time a page of data (e.g., in a user-level buffer 108) is changed by a transaction, the page is essentially edited in place, namely in the cache 110 (FIG. 8). The cache 110 is then written by a cache manager and/or the VMM 112 to the disk (or other suitable non-volatile storage medium) 114 at appropriate times. As generally described above, data can be changed either by mapping the file in memory or by using write APIs. When write APIs are used, typically the cache manager 112 is used to copy the changes into a memory-resident page 116. Note that the cache manager 112 is used to map the file in the system memory. When memory mapping is used, changes are made by the application directly to the system memory pages (e.g., the page 116), which are the same as the cache-manager 112 mapped pages. Changes are noted via "dirty" bits, which indicate that a change resides in the process-private Page Table Entries (PTEs) 118 in case of memory-mapped I/O. Typically, these bits get propagated to a shared (Page Frame Number) PFN structure 120 when the memory manager trims pages from the working set of a process. They can also be explicitly propagated by the application 60 using a system API to flush a mapped section. Note that dirty pages also may get written out periodically in the background.

In order to ensure that the memory-mapped changes are included in a transaction, the system will flush the virtual address range of each application-mapped section at commit time. This flush is initiated from within the context of the application that had mapped them. Transactional semantics may be defined such that only the pages flushed explicitly by the application are included in the transaction (e.g., the flush is made transactional, not the individual modification to the bytes in the user section). Alternatively, this may be accomplished via a system thread which will attach (KeAttachProcess) to the processes that have mapped sections and do the flush. The list of sections is maintained in the corresponding transaction table entry. Note that changes made by file APIs will also need to be flushed to disk at the commit. This is because at the time of paging write, it is not possible to distinguish between a dirty page write remaining from a previous transaction and a change made by memory-mapping in the current transaction.

TxF thus supports both read-only and read/write file opens by transactions. When a transaction opens a file with read-only access that is not currently open by any other transaction, then the semantics on that file are the same as for non-transactional opens. If a transaction opens a file for read/write, then TxF requires one structure for the file, one per stream, and one for the stream version to store its per-transaction context, as represented in FIG. 9. The data structures for this open are represented in FIG. 9, where "File Object" is the object mapped by the user's file handle, "FCB" is the NTFS file control block, "SCB" is the NTFS stream control block for the specific stream opened, "NP SCB" is the non-paged stream control block used primarily to hold the section object pointers for file mapping, and "CCB" is the per-FileObject context structure. Note that a flag in the TxFFO indicates when the file was opened for read by a transaction.

In FIG. 9, the TxFCB structure is an anchor for the undo data for per-file changes maintained by TxF, and also includes a reference to the transaction. The TxFSCB is the anchor for the stream versions, and the TxFVSCB is the anchor for the undo data for a particular version of the stream. The TxFO structure describes a particular transaction's access to a version of a stream, and it captures pointers to the relevant shared TxF structures for that version.

Figure 10:
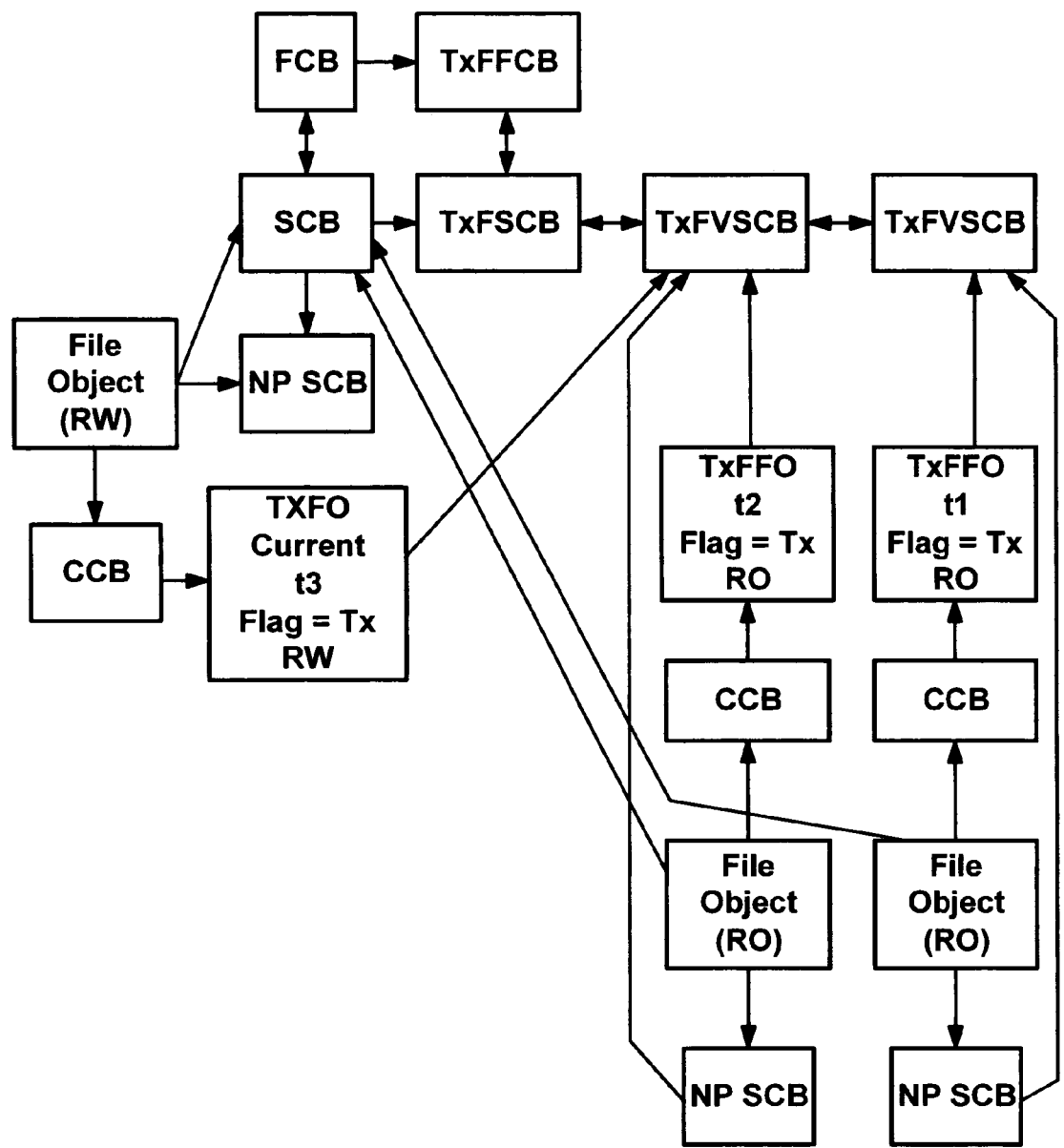

As shown in FIG. 10, if a second transaction t3 opens the file for read/write before the previous read-only transactions are gone, then the old version of the file essentially shifts (to the right in FIG. 10) to make room for the structures representing the new version. FIG. 10 thus represents one read/write open by transaction t3 modifying the current version of the file, one read-only open by transaction t2 accessing the most recent committed version of the file, and another read-only open by transaction t1 accessing an earlier committed version. Note that for purposes of simplicity, each FileObject points to the same SCB, whereby NTFS is unaware of file versions. Also, each FileObject has its own set of section object pointers in a unique, non-paged SCB. Note that normally the section object pointers for read-only transactions are not used, unless the user actually maps the stream. Cached accesses are serviced from the current stream for unmodified pages, and from the log file for modified pages. The TXFO for each File Object effectively captures which version of the file the transaction is accessing.

In general, because TxF transactions have lifetimes that are independent of the NTFS handles, the TxF structures have a lifetime that is independent of the NTFS structures. When both are present, they are linked together as shown in FIGS. 9-10, wherein the unidirectional links are set up using well-defined interfaces on both sides. For example, when a transacted access to a file occurs, the FCB link to the TxFCB is checked. If NULL, it is set up using a TxF routine. However if TxFCB already exists, it is looked up using the File-Id by TxF from the TxF file-table, otherwise a new one is allocated. Similarly, when a FCB is de-allocated and the TxFCB link is non-NULL, a TxF routine is called for the unidirectional (NTFS to TxF) link deletion.

The TxF structures for files are de-allocated when no transacted reader has the file open, or can open that version of the file in the future. Directories are maintained as long as there is name-space isolation information in the TxFSCB structure, even though the NTFS directories may go away due to a delete of a directory itself, which will happen in recursive delete. The lifetime of TxF structures is managed via reference counting.

The Logging Service

In accordance with another aspect of the present invention and as generally described below, for logging and recovery of persistent state, the TxF 70 uses a Logging Service 74 (FIG. 2) that allows multiple-level logging, rather than rely solely on the normal NTFS log, in order to support long-running transactions. As will become apparent below, this provides many benefits. For example, a typical NTFS log is on the order of four megabytes in size, which is presently adequate for short term metadata logging, however a typical user-defined transaction would quickly overwhelm such a log. Also, there will likely be a large number of NTFS operations logged relative to the number of TxF transactional operations logged. Moreover, NTFS metadata commit operations lock up directories, whereby TxF transactions that take a long time would adversely impact a file system's performance (in a hypothetical single-level logging scheme).

The conventional NTFS log is well documented, and is thus not described herein in detail except for a brief summary and to the extent that it is used in conjunction with the transactional file system of the present invention. NTFS provides abort/crash recovery of file system operations by writing undo and/or redo records for those operations to an NTFS, before NTFS makes the change. The NTFS log is a per-volume file for recording operations that affect that NTFS volume, including operations that change an NTFS data structure, e.g., a create file command, rename and so on. Note that the metadata is logged, not the user file data, e.g., the bytes that were written. The log is maintained as a file, and is accessed to recover from a system failure, i.e., if the system crashes, partially completed operations may be undone or redone using well-known techniques. NTFS does not provide durability, i.e., NTFS does not force its log on commit.

In accordance with one aspect of the present invention, TxF transaction and recovery management is layered on top of NTFS, in a multiple-level recovery mechanism. As described above, TxF treats NTFS operations as low-level components to build a user-level transaction. For recovery, TxF maintains a higher-level log, and treats the logged NTFS operations as the "data" with respect to that higher-level log, in the sense that TxF forces its own TxF log ahead of the "data." The "data" in this case is the NTFS log, a recoverable store itself.

Figure 11:
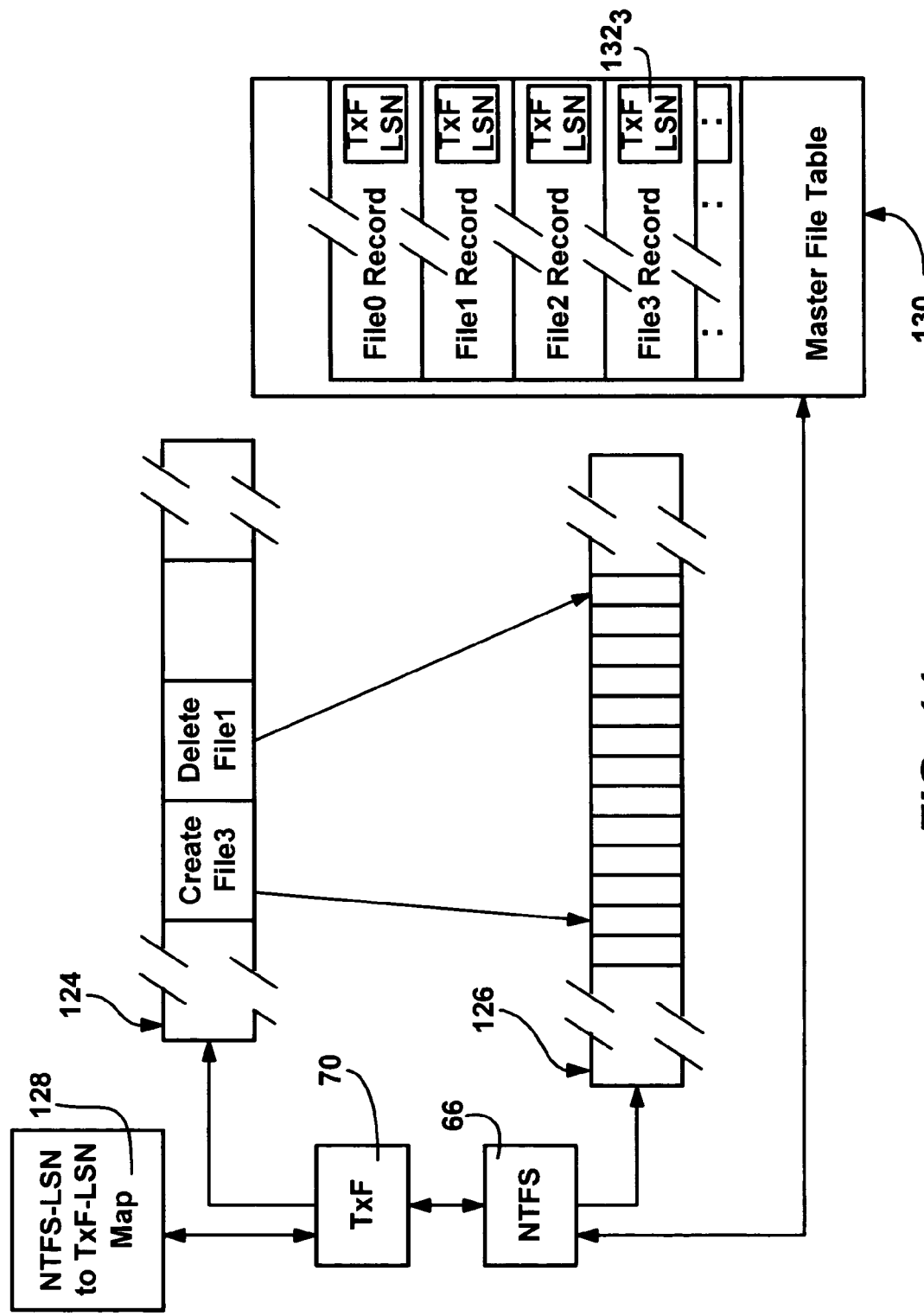
FIG. 11 is a block diagram representing a two-level logging mechanism and mechanism for verifying whether the logs are synchronized in accordance with one aspect of the present invention.

To accomplish multi-level logging, as generally represented in FIG. 11, the forcing of the higher level TxF log 124 before the lower-level NTFS log 126 is accomplished via coordination of the LSNs (herein refereed as the TxF LSN and the NTFS LSN) of each log in a manner that exploits the already available recoverability of NTFS 64. For data that is not managed by NTFS transactions (i.e., the stream bytes themselves), TxF 70 essentially manages the recoverability entirely, as described below.

To ensure that the higher level TxF log 124 is forced ahead of its "data," i.e., the records in the NTFS log 126, (without inefficiently forcing the TxF log ahead of every NTFS operation), a TxF callback is provided that NTFS 64 calls every time NTFS 64 is about to force data in its log 126. In the call, NTFS 64 indicates the highest NTFS LSN about to be flushed. At the same time, TxF 70 maintains a map 128 of the recent NTFS transactions TxF has used, to map the NTFS commit LSNs to the respective TxF LSNs. Note that the name-space modification operations are designed such that TxF has knowledge of the NTFS commit LSNs. The NTFS log is not durable, in that it is flushed to disk relatively infrequently. As a result, a reasonable number of TxF records are likely to be present in the log buffer and flushed together to disk in a single I/O operation.

In response to the callback, TxF 70 forces the TxF log 124 up to the TxF record corresponding to the highest NTFS Commit-LSN that is being forced in the NTFS log. It should be noted however, that flushing the TxF log 124 up to this highest record is only more optimal, as other ways of ensuring that the higher-level log gets flushed first (e.g., flush all new TxF records anytime NTFS is about to flush its log) will suffice. During recovery, NTFS completes its recovery before TxF can begin its recovery.

Although this keeps the TxF log 124 flushed ahead of the NTFS log 126, it is possible that some log records near the end of the TxF log may have performed NTFS operations not committed by NTFS, and such records may be intermixed with records that have been committed. It is important to distinguish the TxF log records that had their corresponding NTFS operations committed from those that have not, since this determines whether or not a TxF log record is applied during recovery.

As will be understood, this is important because it is not correct to repeat an operation during redo, or to undo an operation that never quite happened. As an example, consider the following situation that may be logged in the TxF log:

---

Create Y
    Commit
    Rename X → Y (superseding rename)
      {actually two log records:
         delete Y (rename to a link in a system dir) --
           undo of this is: rename system link
           back to Y
         rename X → Y
      }
    SYSTEM CRASH

---

In the above situation, it is not possible to know whether it is correct to reverse (undo) the rename operation. Simply doing the reverse each time is not correct, since if the rename had never actually happened in NTFS, Y will be renamed to X, superseding it. Then, upon attempting to open the system-link, it may fail since the link will not exist since the NTFS operation did not take place. File X would be lost, and Y renamed to X. However, if TxF 70 is able to ascertain whether the rename had happened or not, it is able to precisely determine whether or not to apply the undo operation.

To determine whether an operation actually happened, i.e., was committed by NTFS 64, before requesting an operation, TxF writes the corresponding record to its log 124. TxF then receives the TxF LSN, which it provides to NTFS 66 with the requested operation for a given file. While it is feasible to have NTFS 66 put the TxF LSN into its corresponding NTFS log record (or records) following the commit, this is inefficient. Instead, when NTFS commits the operation, as part of the commit, NTFS writes the TxF LSN to a record maintained on the NTFS volume for that file. In NTFS, a record is already maintained for each file (and directory) on the volume in a structure known as the master file table 130. Thus, the TxF LSN is written to a field (e.g., $132_3$) in the record for this file (e.g., File3), as generally shown in FIG. 11. Note that another data structure may be alternatively used, however the per-file record is already available on each NTFS volume.

Then, following a crash, during recovery, after TxF lets NTFS fully perform its recovery, TxF first checks to determine if the operation logged in the TxF log made it to the disk or not before the crash (by calling NTFS via a NtfsTxFGetTx-FLSN(file-id, *TxFLsn) call). If the NTFS operation for a file was committed and was persisted to the disk before the crash, the TxF LSN of the record in the TxF log 124 is less than or equal to the TxF LSN in the file record field, since NTFS recovery guarantees that the file record will be restored. If a TxF LSN in the file record is less than the LSN of the TxF log record (or is not in the file record for that file), then it is known that the NTFS operation was not committed, and that the corresponding TxF log record must not be applied for undo.

Note, however, that to ensure proper recovery, if an object is deleted during the recovery window, TxF will delay the deletion of the file-record (and hence preserve the file-id) until after the deletion log record is forgotten in the log. This is done by creating a system-link to the file. Further, if a new file is created, the TxF log record is not written until after NTFS determines the file-id it is going to use for the creation. This accurately records the file-id in the TxF log. Note that for non-transactional creates as well, NTFS is expected to write the current TxF LSN in the file record, thereby handling the case wherein a file-id (including the sequence number) gets reused during the recovery window, and making TxF skip log records before this creation.

Then, if the NtfsTxFGetTxFLSN call finds that the file-id does not exist at recovery time, then either the file got deleted non-transactionally after the transaction committed, but before the crash, or the crash happened soon after a create operation. Note that in the first event, TxF was not involved and the file-record was deleted during the recovery window. In the second event, the TxF create log record went to the TxF log disk, but the NTFS commit for it was not persisted. This second case will be detected only when processing a create log record.

Since undo records are used to abort incomplete transactions, records for which the file-id does not exist as seen by NtfsTxFGetTxFLSN may be simply ignored.

It should be noted that during abort, crash recovery and roll-forward recovery, redo and undo actions driven by the log are initiated at the top of the filter driver stack in the NTFS filter-driver model, allowing any intermediate filter-drivers to see the actions. The IRPs corresponding to the redo and undo actions are specially marked so that the filter drivers may choose to ignore them. These IRPs will include the usual transaction state and the file-object will point to the transaction object as usual. However, since the transaction will be in the special state, TxF will know that they need to be treated specially. For example, TxF does not try to include these actions in a transaction, or treat them as non-transactional.

Figure 12:
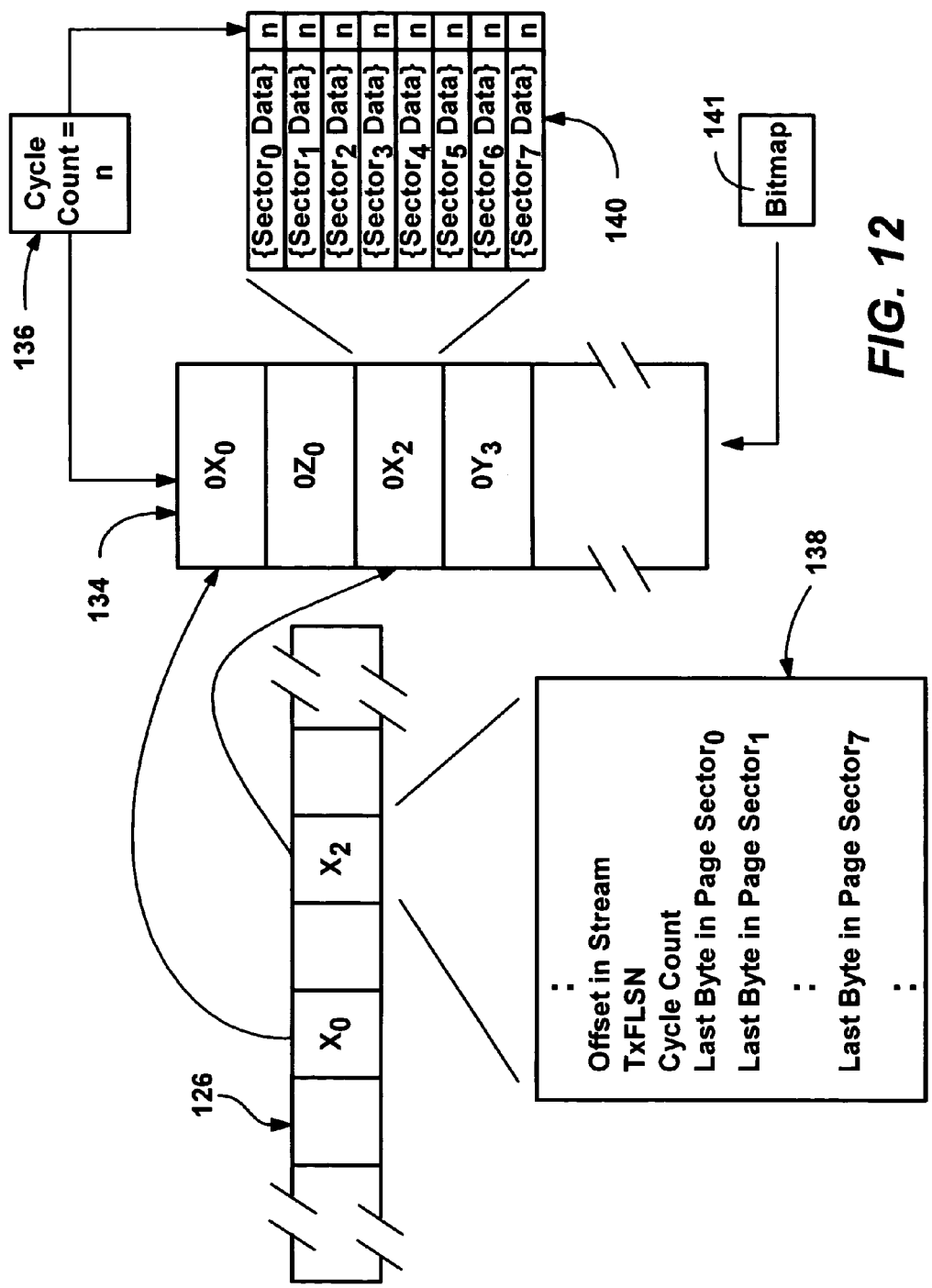
FIG. 12 is a block diagram representing page data being logged and a mechanism for verifying whether the page data is synchronized with a log in accordance with one aspect of the present invention.

In addition to logging namespace operations, the TxF component 70 works with the logging service 74 to record page changes, among other operations. As described above, to preserve versions and also to support undo operations in the event of an abort, before a change is actually made to the page in memory via an API, a corresponding undo record is written (non-forced) to the TxF log 126. As shown in FIG. 12, the entire page is then written (typically to an in-memory and on-disk stream of pages called the TOPS stream 134, described below), which allows a versioned reader to read the page in a single I/O operation. After the log write, the change table 98 for this file is marked with the log sequence number (TxF LSN and an offset within the TOPS stream 134), and the change is then applied to the page.

For a page changed via paging I/O, e.g., resulting from a page having been modified by a user-mapped section and/or a page that was modified by an earlier call to an API that is now being written, a paging write is performed. This paging write can be in a background thread, or may be part of a flush at commit time. In any event, TxF 70 will first check the change table 98 (FIG. 6) to see if the undo has been captured in the TxF log 126. If so, the system forces the TxF log 126 up to the TxF LSN marked in the table 98, which in most cases, will return without I/O. If the change table 98 is not marked, an undo version of the page is obtained and written to the TOPS stream 134 and the TxF log 126. Multi-page I/Os are common, as the background threads attempt to group pages together in file-offset order. In these cases, multiple undos are written in a single, large I/O. The undos in such cases will also be read in a single, large I/O.

After the prepare record is forced to the TxF log 126, the undo images are on the disk in the TxF log 126 and the TOPS stream 134, and the modified file pages are in their location in the file. As a result, commit is a simple matter of writing a commit record to the log 126. Abort is accomplished by going through the undo records in reverse order, and applying them to the base file, followed by a flush of the file, followed by an abort record written with force. These undo records are ignored at recovery time if an abort record exists in the log 126. Note that by flushing the file during an infrequent operation (abort), large (page-sized) compensation log records (CLRs) need not be written as redo records, which significantly conserves space.

Obtaining an undo image is the same as getting the previous committed version of the page, i.e., the undo image of the file is first searched in the previous versions of the file. If the image is resident in the memory, the undo image is retrieved from the memory. Otherwise, the image is read from the disk by a non-cached I/O operation, since dirty bits are process private and not necessarily known, there is no way to determine whether the currently resident memory image may be dirty.

As described above, each time a page is changed by a transaction that has a file opened for write, the page is edited in place, namely the cache. The cache is then written to disk at various times (FIG. 8). However, before the page data is changed, the old page data needs to be preserved, so that if the transaction aborts or the system fails, the old page data can be restored. To this end, the old page is copied into the TOPS stream 134, and the change logged in the TxF log 126. As shown in FIG. 12, the log record (e.g., $X_2$) includes an offset into this page, whereby the log 126 need not maintain the data, only a record corresponding thereto. Thus, to enable restoration of pages, TxF uses change logs that sequentially record changes over time. Note that for versioning, the offset in the change table 98 into the TOPS stream 134 is used for efficiency, instead of accessing the TxF log 126. However, in the event of a system failure, the Version Stream Control Blocks, which are in-memory structures, do not exist at recovery time. Moreover, any versions of the file solely in-memory are non-recoverable. Thus for recovery, the records in the logs may be used for aborting a transaction during failures and for durably completing transactions that got committed before the failure. The sequential nature of the log entries (or, log records) preserves the order of the changes.

In the present invention, the log record for page writes is split into two parts for performance and other reasons. The part inline with the main log preserves its order with respect to other logs, while the other part includes the (relatively larger number of) bytes that provide the detail for the operation, i.e., the changed page data. Thus, in accordance with one aspect of the present invention, and as shown in FIG. 12, each time a page is to be changed via a transaction, the old page data is copied into the (contiguous) TOPS stream 134, and the change logged in the TxF log 126. As described above, after adjusting the tables to map transactional readers to the copied page, the page may then be changed. As shown in FIG. 12, the log record (e.g., $X_2$) includes an offset into this page in the stream of copied pages, whereby the main log need not maintain the data, only the record with the offset corresponding thereto.

However, for performance reasons these logs are flushed to disk differently. As a result, neither the page nor the log 126 may be persisted at a given time, e.g., the system may fail before the log 126 is flushed to disk and/or the page is flushed to disk. A simple way to ensure that the page data is not lost would be to enforce an ordering between the two, i.e., always flush the page to disk before flushing the log record to disk. Then, when using the log upon recovery, if the log record is present, the correct page version that corresponds to that record is also known to have been persisted. However, this order dependency has been found to significantly reduce system performance, in that log flushing operations operate more efficiently on different logs depending on many unrelated factors. For example, to improve performance, pages are normally flushed in multiple sets, e.g., sixteen pages at a time using a lazy write algorithm, while logs may be flushed when full, or at a different time in a background process.

In accordance with another aspect of the present invention, a system and method are provided that enable the pages and the log to be flushed to persistent storage in an arbitrary order with respect to one another, yet in a manner that ensures that the proper page is restored in the event of a failure. This is accomplished by adding information to the log 126 and to the page data that in effect link the two pieces of information to each other in a consistent state, e.g., in time. More particularly, a cycle count 136 (e.g., in a byte, although optionally a word or even larger may be used) is maintained that represents the current state of the page, e.g., the cycle count is incremented each time the pointer to the TOPS stream 134 wraps around back to the start, and that cycle count is synchronized with the log record.

In accordance with one aspect of the present invention and as represented in FIG. 12, synchronization is accomplished by maintaining the cycle count value in the log record associated with the page copied to the TOPS stream 134. This is generally shown in FIG. 12 by the box labeled 138 providing an expanded representation of some of the record's data fields. As also shown, the last portion (e.g., byte) in each sector is copied to the log record for preservation thereof.

Note that a page comprises eight sectors of 512 bytes each as described herein, although as can be appreciated, other page and/or sector sizes are possible. Also, the last portion of each sector in the stream data is replaced with the cycle count, as generally shown in FIG. 12 by the box labeled 140 providing an expanded representation of the page data with the cycle count substituted in the last portion of each sector. As represented in FIG. 12, if both the page and the log record are flushed, the cycle count values at the end of each sector will match the cycle count values in the record, i.e., both will have a matching signature.

If only the page data (the out-of-line part) was written to disk, the system will not find the inline (log) record, and thus the page will not be found and there is nothing to restore. The state is known to be consistent.

Figure 13:
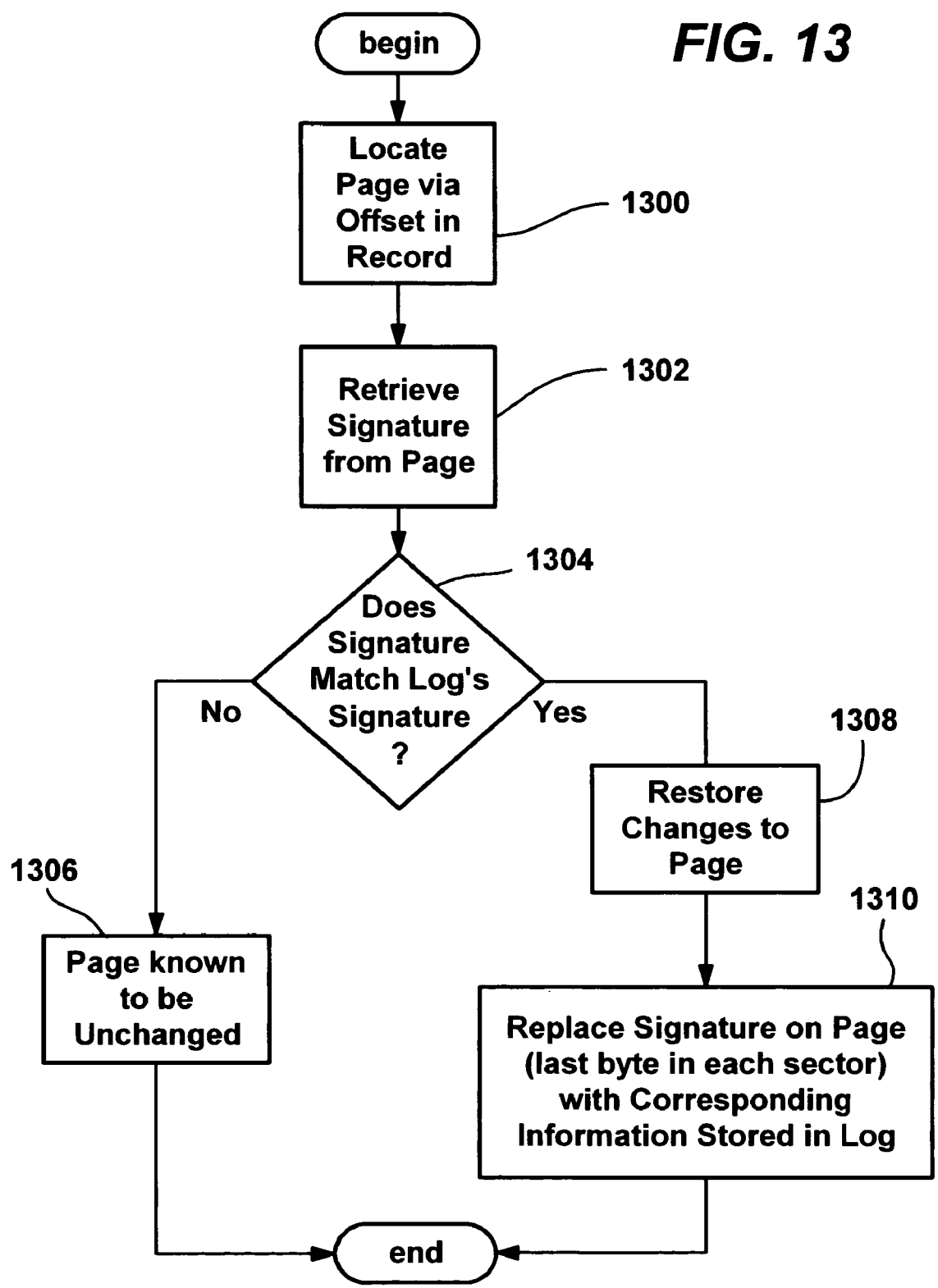
FIG. 13 is a flow diagram representing actions taken based on whether page data is synchronized with logged records in accordance with one aspect of the present invention.

However, if the record is present in the log, the page may or may not have been flushed before the system crash. FIG. 13 generally represents the logic for determining whether a page and its log record were both flushed to disk when the record is reached during rollback. First, at step 1300 the record is accessed to find the page via its stored offset into the stream 134. Then, at step 1302, the page is read and the last portion in each sector extracted therefrom, and at step 1304 compared to the cycle count stored in the log record. If only the inline (log) record was written to disk, following a crash the unique signature (each cycle count) stored in each sector of the out-of-line part (the page data) will not match the cycle count stored in the in-line record data. In this event, as represented in step 1306, the system concludes that since the old page was not written to disk, neither was the new page, (which is only flushed if the two logs are flushed). Thus the page is known to be already in its previous, old state.

Conversely, if the cycle count in the log matches the cycle count in the last portion of each sector of the corresponding page at step 1304, both the log and the page are known to have been successfully flushed. Thus, the copied page is known to have been persisted, whereby the last portion of each sector stored in the log record is restored to the copied page at step 1308.

At this time, the copied page may be accessed by a reader, and provide the appropriate version. Any logged changes made to the current page may be used (step 1310) for new readers and/or a writer to see. In this event, it is known that the old data was correctly captured, and has to be restored to the file page as part of the abort. Note that in spite of the abort, existing transactional readers will continue to read the old data from the TOPS stream 134.

It should be noted that the use of a unique signature at the end of each sector further detects torn (partial) writes, wherein some of the page, but not all, was copied. Note that the disk hardware guarantees that a sector will be fully written, but not does not guarantee that a page of data (e.g., eight sectors) will be written as a unit. In such an event, the cycle counts will be some mixture of "n" and (presumably) "n-1" values, and the signature will not match the logged signature information. Such a situation is treated as if the entire page was not persisted.

Note that when the cycle count itself wraps around, there is a potential for it to match the count making up the signature on an existing page, (e.g., one that has been in memory for a relatively long time), thus making a partial write undetectable. For example, if the wrapped cycle count is used, and if it matches an existing cycle count stored on a page, the signature will be the same whether all of the page or some of the page is copied. As can be understood, signature checking in this instance would indicate that the entire page data was persisted when in fact it was not.

This problem can be solved in a number of ways. One such solution is to read the page once after each cycle wraparound event to verify that there is not a match. If there is a match, one of the two cycle counts can be adjusted to avoid the match. To ensure this happens only once per cycle wraparound (i.e., each time the cycle count wraps to zero), a separate verify bitmap 141 may be used to maintain the "verify" state for each page, i.e., each bit is in one state following a wrap, and toggled when the page is first checked for a cycle count match. Note that a freespace bitmap is used to track whether a page is free or in use, and for efficiency, the above-solution adds an additional bitmap to track the verify state.

An alternative solution (to the above-described read and compare operation) is to again track the verify state, however when the "verify" state is set at the time of page use, the cycle count is written into the page as described above and a write is forced. If the write succeeds, the write is not partial. For a large TOPS stream, this alternative scales well due to few input/output I/O operations, as it is likely to be relatively rare that a cycle count will match a page.

Another alternative is a combination of the first two solutions combined with a checking of page residency, i.e., if a page is resident in high speed memory, perform the first (read) alternative since no actual disk read is necessary, otherwise perform the second (write) alternative.

Deferred Redo Alternative

The above-described recovery mechanism writes the dirty pages of a file to disk at commit time, which prevents batching page writes across transactions. To achieve the batching of page writes across transactions, an alternative, "deferred-redo" scheme that does the reverse in terms of recovery may be provided. This scheme writes redo records to the log, and applies old committed transactions to the base file when no reader is still reading it. In order to support the read of older committed versions, the changes are not made in-place, but instead, can only be applied to the file in-place when the existing in-place version of the page is no longer needed.

Figure 14:
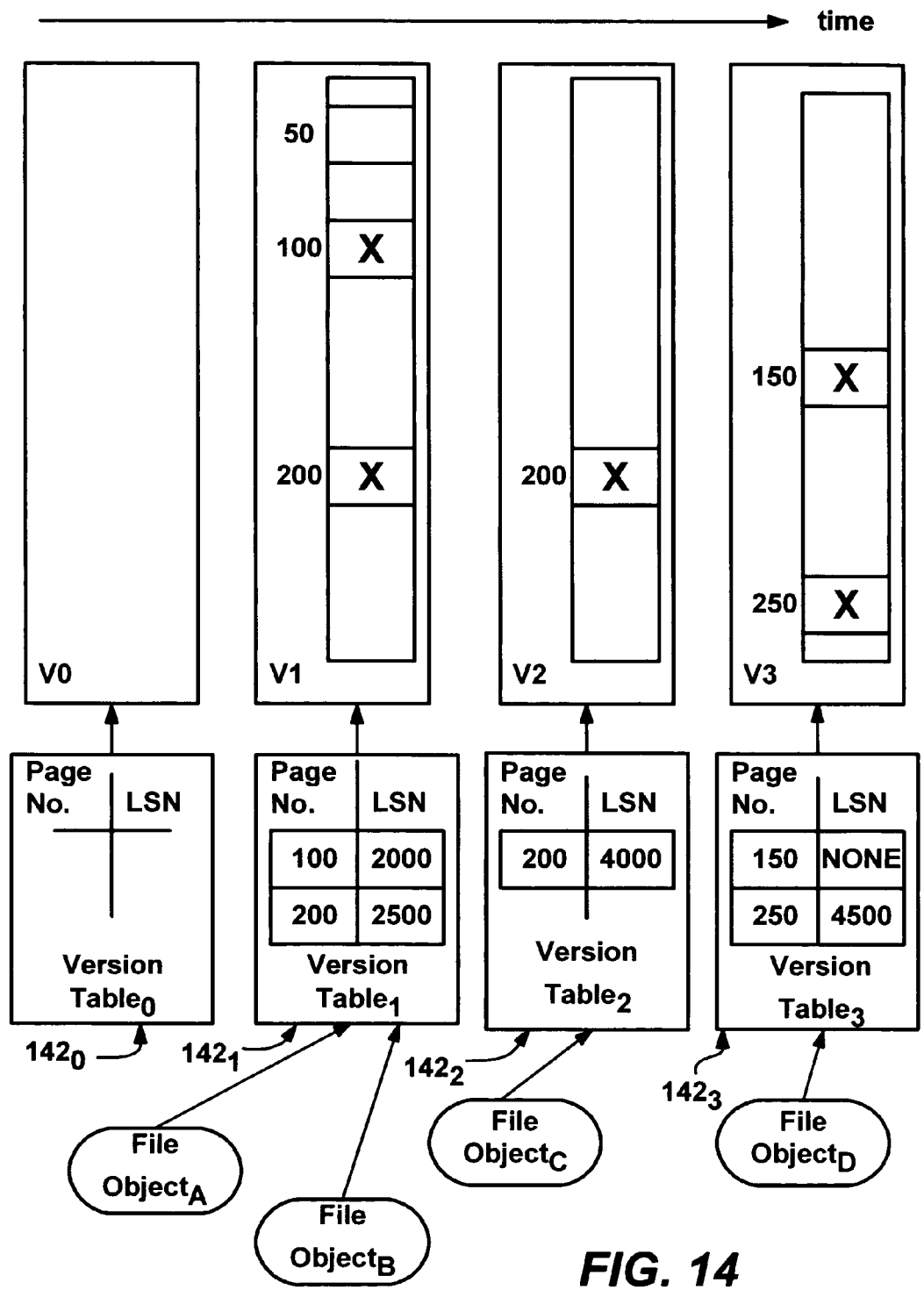
FIG. 14 is a block diagram representing a plurality of file versions maintained over time in an alternative versioning scheme in accordance with one aspect of the present invention.

The deferred-redo scheme shares many of the principles used by the in-place update scheme, e.g., it supports versioning in a very similar way, with Version Control Blocks and multiple in-memory streams. However, the Change Tables keep the LSN of redo pages, rather than undo. As generally shown in FIG. 14, the oldest disk version is always the base file, and the newer versions build incremental changes on top thereof. Older versions are merged into the base file as readers go away. In order to take advantage of the main benefit of this scheme, multiple versions may be merged into the base file at the same time, thus gaining I/O efficiency. Another benefit of merging multiple versions at the same time is that the log can be read efficiently in large reads.

However, the log may be filled with pages that back memory for the (possibly many) active files, essentially turning the sequential log into a random page file that also doubles as a recovery log, which may become a bottleneck in the system.

Similar to the in-place update scheme, the latest version is updateable. There is a Version Control Block (TxFVSCB) associated with every version, and each TxFVSCB points to the Change Table, an in-memory table that records the page numbers changed by the version. Along with each page number, a disk address may be stored to find the page on the disk if it has been written at least once (redo image). Lack of a disk address implies that the page has never been written to the disk. In order to save memory, page-ranges may be stored in an entry where pages are stored contiguously on disk.

The Version LSN is the LSN of the commit record of the transaction that committed the version. There is no such LSN for the currently updateable version. The SOP pointer is the pointer to the Section Object Pointers structure corresponding to this version. Using this pointer, the in-memory pages can be found. A Version length is similarly provided.

The Version Control Blocks are linked in a list in time order. The oldest version is the base stream, and the change table does not contain any entries for this version.

At the time of open, one of the versions is given to the file-handle just like in the above-described alternative scheme. The newest version's in-memory stream is backed partially by the log (not entirely by the base file). As such, changes to the stream get written to the log. Reads are done from the base file if that page has not been changed in any of the versions in the version window, otherwise, they are done from the log.

At the time of read, the change table corresponding to that version is consulted to determine if that page had been modified in that version. If so, the I/O is directed to the appropriate place in the log to fetch the page in to satisfy the fault. If not, then the next previous version is consulted for the page; this process continues until the most recently committed copy of the page is found. If multiple versions include copies of the page, their memory residency is checked with a VMM call. If a memory resident page is found, it is copied, otherwise, it is read from the log using the most recent version's LSN. Note that it does not matter if the page is trimmed from the system memory between the time the residency is checked and the copy was made, as a recursive fault is generated and the page copied after that. In order to get the system address to copy these pages in, the cache manager will be used to map them in the system address space.

In FIG. 14, four versions V0-V3 are shown, (although other numbers are feasible), wherein pages marked with an "X" represent a change in a version. The Change Tables $142_0$-$142_3$ show the LSNs for the pages that have been written. Some pages in the most recent (updateable) version have not yet been written. In this scenario, consider an example wherein the FileObject$_B$ accesses page fifty (50). The change table $142_1$ for file version V1 shows that this page has not been changed in that version. Therefore, the fault is handled by checking the residency of file version V0 for that page and copying it if resident (without taking a fault). If file version V0 does not have the page resident, then it is read from the disk, (in this case, from the base file).

By way of another example, if FileObjectB accesses page two-hundred (200) and that page is in memory, the access simply works. However, if not, a page fault is generated, and the read is satisfied by reading it from the log at LSN 2500.

As another example, consider the FileObject$_C$ accessing page one-hundred (100). Since this page has not been changed in version V2, version V1 is checked and the read satisfied from either the memory image (if resident) or by reading the log at LSN 2000.

For file writes, at the time of page-out, the page is written to the log in the form of a redo record that also describes the stream-offset and stream name. At this time, the LSN is marked in the page-slot in the change table for that version. Page writes happen in the background by one of the system threads, and are typically written in sequential page order. At commit time, the dirty pages within that version are written to the log, followed by a commit record. If a page is written out multiple times during the transaction, multiple log writes are done. These writes go to the end of the log, and the change table entry is changed to point to the new location. If a new write transaction starts after the commit without any intervening read transactions, the main memory stream is reused by the new transaction. Otherwise, it is claimed by the reader, and the writer transaction creates a new stream to work with. Note that in the deferred-redo scheme, the changed pages may be written to a TOPS stream (just like in the in-place-update scheme) to achieve related benefits.

After a crash, recovery is relatively straightforward, as redo information of the committed transactions is in the log, and can simply be applied to the main data stream. Note that the version control blocks are in-memory structures, and therefore do not exist at recovery time.

As old readers end their transactions, old versions no longer need to be kept around. At such a time, versions are merged into the main stream one version at a time, starting with the oldest. As versions are merged, they are removed from the linked list of versions. The merge happens one page at a time, by copying the changed pages in that version (page numbers looked up in the change table) to the base stream and forced to disk. This copy operation reads the log for the pages that are not currently resident. Large I/Os are done to capture page ranges from the log if possible. For example in FIG. 14, the version V1 can be merged into version V0 if the version V0 is not needed to support versioning any more. This merge can happen without locking version V1, since a copy of the each page exists in version V1 and version V0 while the merge is in progress, and the change table for version V1 is unchanged through the process.

After the merge is completed, if version V1 is not in the version-window, the version control block for V1 is simply removed from the list of versions. In general, the merge will be delayed until multiple versions are freed from readers. In this example, V0, V1 and V2 can be merged together into the base file when they are out of the version window. For a multi-version merge, the change tables are first merged in a way that the LSN from the highest version number is picked when the same entry is modified in multiple tables. This essentially batches writes across transactions, and is one of the advantages of this scheme. After a version has been merged, its log records are eligible to be removed from the active log.

In general, the merge is done as early as possible. Every time a reader goes away, the version window moves forward. At that time, some versions may be marked as eligible for merge. When multiple versions are marked, a work item is put on one of the system threads to do the merge.

Both the in-place update scheme and the deferred-redo scheme perform roughly the same number of I/Os. The in-place update scheme may read undo synchronously, (since it may sometimes find it in memory, such as if a concurrent reader has read them recently). The in-place update scheme writes the page out to base file, and also writes the undo to the log sequentially. In contrast, the deferred-redo scheme needs to write the redo in a large random I/O, and needs to read the log randomly to merge a version. Moreover, the deferred-redo scheme needs to write the file page to disk, although it minimizes writes across versions. The chances of finding these log pages in memory are thus very low, given how long the merge may be delayed.

There are qualitative differences in when and where the I/Os are done. In the deferred-redo scheme, the most recent memory stream is backed by the log, not the base file. This is very likely to be the most commonly used stream because it handles the update work, comparatively burdening the log. For versioned readers, both schemes use the log as a paging device.

The deferred-redo scheme does less work synchronously with the commit processing, since a lot of the transaction work is done in the background, but does not appear to be any faster to a writer for each write API or memory update, since these are done to the cache. Instead, the flush at the commit time is where the difference in the responsiveness of commit shows up. For larger update transactions, the background system threads are likely to schedule asynchronous writes, which somewhat reduces the responsiveness difference. Similarly, the in-place update scheme can also somewhat reduce the burden at commit by doing the undo work for file APIs in the background, but is not feasible for the changes made in user-mapped sections.

The in-place update scheme is less complex than the deferred-redo scheme, because the in-place update scheme does not need to deal with the problem of scheduling asynchronous merge operations. Also, the in-place update scheme does not need to deal with the speed mismatch problem between the foreground and background activities, which will at times may block log space and create resource acquisition problems.

Lastly, archiving and roll-forward is possible without changing normal run-time logging algorithms with the deferred-redo scheme, since redo records are available in the log. However, since there are no undo records, some forward scanning in the log needs to be done to find out the commit status of a transaction before applying any redos for that transaction.

File System Transactions over a Network

Figure 15:
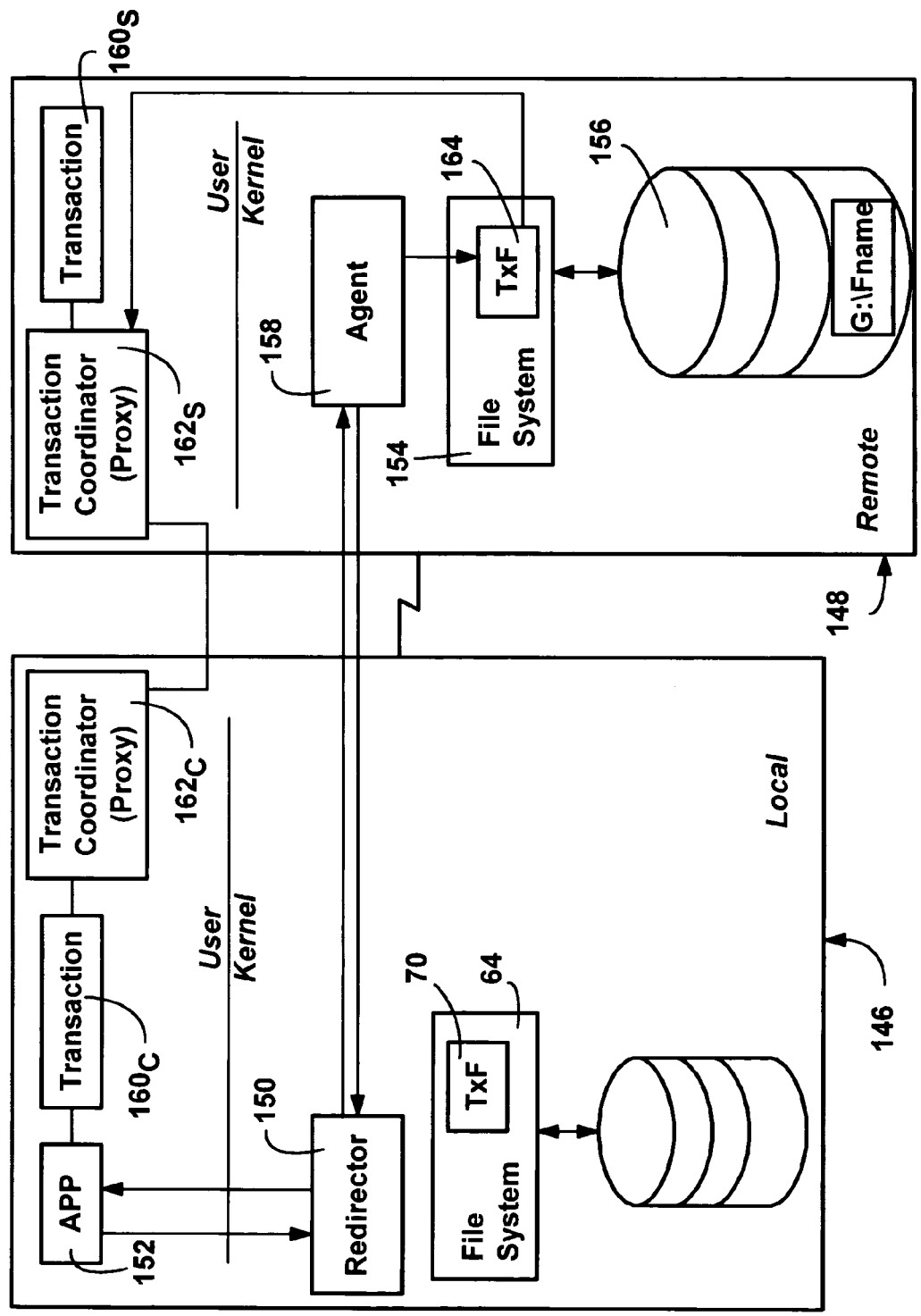
FIG. 15 is a block diagram representing transactional file system operations over a network in accordance with one aspect of the present invention.

Remote files are accessed via an internal kernel-to-kernel "redirector" protocol (e.g., the SMB protocol), as generally represented in FIG. 15. This protocol reflects file-system operations performed on a client machine 146 on a remote machine 148, e.g., a file server. Of course, other protocols and mechanisms (e.g., Wev DAV, NFS and so forth) can achieve equivalent results. To this end, as with non-transactional file system access, remote files are identified and IRPs are directed to a redirector file-system driver 150 on the client machine 146. As is known, this driver 150 interacts with a cache of the client machine to read and write data. Requests such as file system request from an application 152 directed to a file system 154 of the remote machine (e.g., to access a file G:\Fname on a remote disk 156) are intercepted by the redirector driver 150 and sent to the remote machine 148, where an agent 158 (daemon) thread translates them into file-system operations at the top level of the driver stack.

For remote transactional file system operations, to open a file, the client redirector may, for example, use COM/OLE to marshal a DTC transaction object $160_C$ into a flat byte-stream that is provided with an open request to the server 148. As can be appreciated, other mechanisms may achieve equivalent functions and/or results, and although COM/OLE operation is described herein, this aspect of the present invention is not limited to COM/OLE. In the COM/OLE example, the transaction object $160_C$ is attached to the client thread that is requesting the open. Note that the server machine 148 is not concerned as to where a transaction originates, as long as it can get hold of a copy of the DTC transaction object $160_S$ within its kernel space. Similarly, the server 148 does not care which thread or process works on behalf of the transaction. Instead, the agent 158 at the server 148 converts the flat byte stream back into a usable object, which is available within the kernel. At this time, the server treats the request like a local transaction $160_S$, and enlists it with a counterpart DTC proxy $162_S$ on the server, essentially telling DTC to contact the server 148 (and the TxF component 164 therein as the resource manager) for subsequent transaction work. Note that this is appropriate because the server owns this transaction object $160_S$. Since transaction-IDs lie in a distributed namespace, transactions can be originated anywhere, but the proper file-synchronization based on the transaction-id happens on the server 148.

The server essentially treats file system requests as if they are for the local case, whereby the local TxF component 164 handles the transactional file system requests. However, the server 148 does remember that the corresponding file object is for a file opened by the client 146, and that the client has cached pages. Therefore, at commit time, the server 148 notifies (via the redirector protocol) the client 146 to flush its cache to the server, as well as flush any mapped sections that might be opened on the client (the client tracks of the mapped sections). The data normally arrives at the server 148 in a somewhat lazy fashion, i.e., whenever it is paged out of the client's cache/memory. As data arrives, it overwrites the cached copy on the server. Note that this is similar to the prior file-system models wherein multiple open handles or mapped sections overwrite each other.

For redirector-based file create operations, the above described concept in which CreateFileEx in the user-mode marshals an ITransaction object (e.g., via the DTC ItransactionTransmitter method) into a flat collection of bytes, is also used for marshaling ITransaction over a network. Because no communication with the transaction manager is required in the ITransactionTransmitter call, it is relatively inexpensive and thus may be done for each create. However, the Receive call (described above) does require communication with the transaction coordinator (or its proxy), which in the redirector-based case is on the remote machine 148. Nevertheless, since ITransactionReceiver is done only once for each transaction in the entire network (on the server 148), this cost of communicating with the transaction coordinator $162_S$ is not significant.

In this manner, transactional remote file access is thus transparently supported, i.e., an application can essentially access files anywhere on the network, using remote file access, as well as directly by creating application proxies on multiple machines. As a result, the same transaction may involve one or more local processes and remote processes, at the same time.

The redirector protocol is generally optimized for the case where a single client has a file opened for remote access. In such a case, a lot of network traffic is avoided by keeping a local disk cache of the file. The changes are flushed only when needed, i.e., at file close time. However, this arrangement gets disabled whenever another client opens the same file concurrently. Opportunistic locks (Oplocks, essentially a token indicating ownership) enable this, whereby the changes to the above "flush at closing" scheme are minimal. More particularly, at commit time, the client will be asked to flush the changes over to the server, as usual. At abort time, the client will asked to mark the client handle as "doomed," such that the changes are simply thrown out once the handle is closed. Note that the redirector protocol may be enhanced to allow the server to invalidate the client's mapped sections in some circumstances, just like in the local case.

Namespace Isolation

Isolating a transaction's changes from other transactions is a key property of transactions. In a transactional file-system, isolation not only applies to the data stored in the files (described above), but also to the file and directory name hierarchy under which the files are organized. In accordance with another aspect of the present invention, there is provided a technique for implementing name-space isolation in the file/directory name hierarchy. The technique does not require locking the names or directories for the duration of the transaction, and also works with non-transactional operations attempted on files being used in a transaction.

By way of example, consider a file that has been created by a transaction that has not yet committed. Note that instead of a file, a directory may be created, however for purposes of simplicity the present invention will be primarily described with respect to files. It should be understood, however, that files and directories are generally treated equivalently with respect to the namespace operations that are described below. A transaction-created file (or directory) should be accessible to the creating transaction without restrictions, but should not be visible to any other transaction, e.g., another transaction that tries to open it or lists its parent directory. Only when the creating transaction commits should the file become visible to other transactions, and if it instead aborts, the file should become invisible to everyone. Non-transactions (e.g., requesting an enumeration of the parent directory) will see such a file, however it is alternatively feasible to make such a file invisible to a non-transaction until committed.

Similarly, if a file (or directory) is deleted by a transaction that has not yet committed, the deleted file needs to continue to be accessible to other transactions as if the delete never happened until the time of commit. The deleting transaction, however, will see the effects of the deletion, and will be able to create a different file with the same name in its place. Upon commit, the file that was deleted will be removed. Non-transactions will see the effect of the deletion, i.e., not see the deleted file, however a non-transaction will not be able to create a new file with the same name as that deleted by an uncommitted transaction, to avoid a conflict should the transaction that deleted the file/directory abort and the delete undone. Again, it is feasible to alternatively treat a non-transaction as if it were a different transaction and thus continue to see a transaction-deleted file, however this is less preferable.

Moreover, if a file (or directory) is renamed by a transaction, it will continue to be available with the original name in the original directory for the other transactions, and the new name will not be visible to other transactions. The renaming transaction will see the effect of the rename, and will be able to use the old name to create a different file. Note that a rename is essentially a combination of a creation of a new link and a deletion of the old link.

Figure 16:
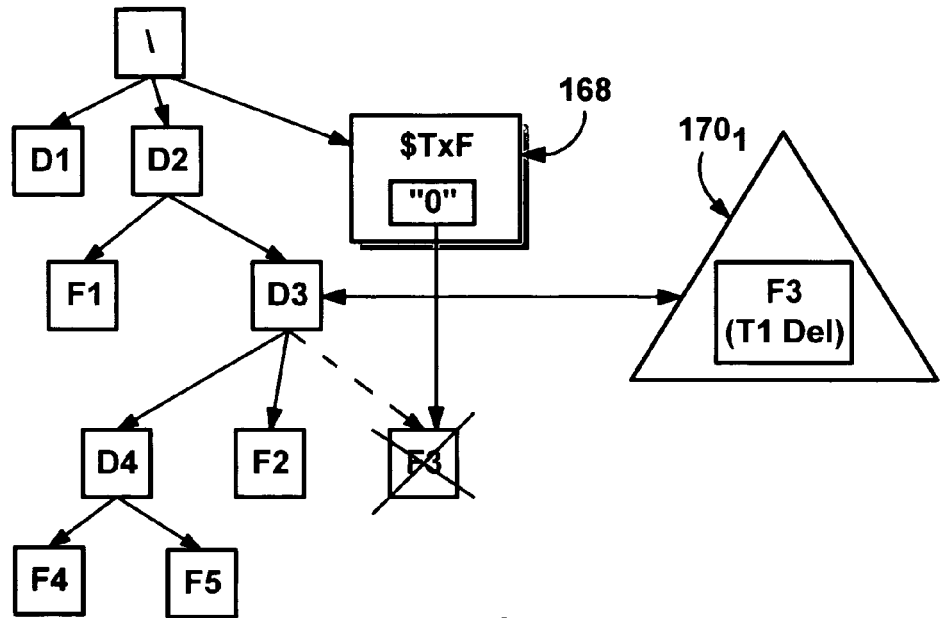
FIGS. 16-18 are block diagrams representing hierarchical file structures and the use of isolation directories to provide namespace isolation in accordance with one aspect of the present invention.
Figure 17:
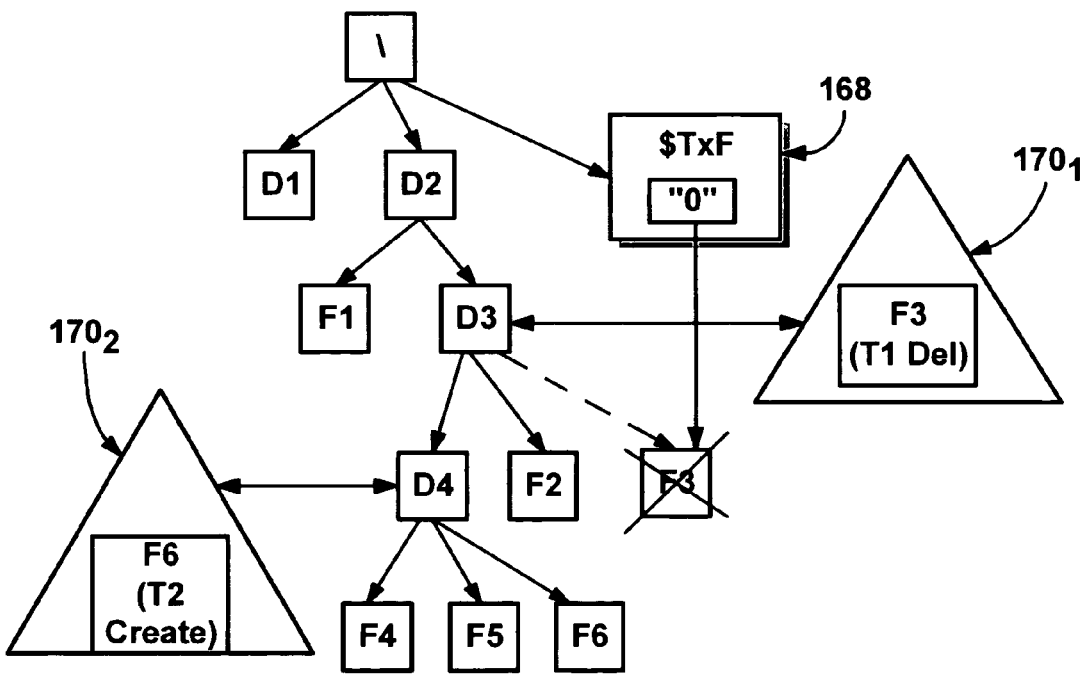
Figure 18:
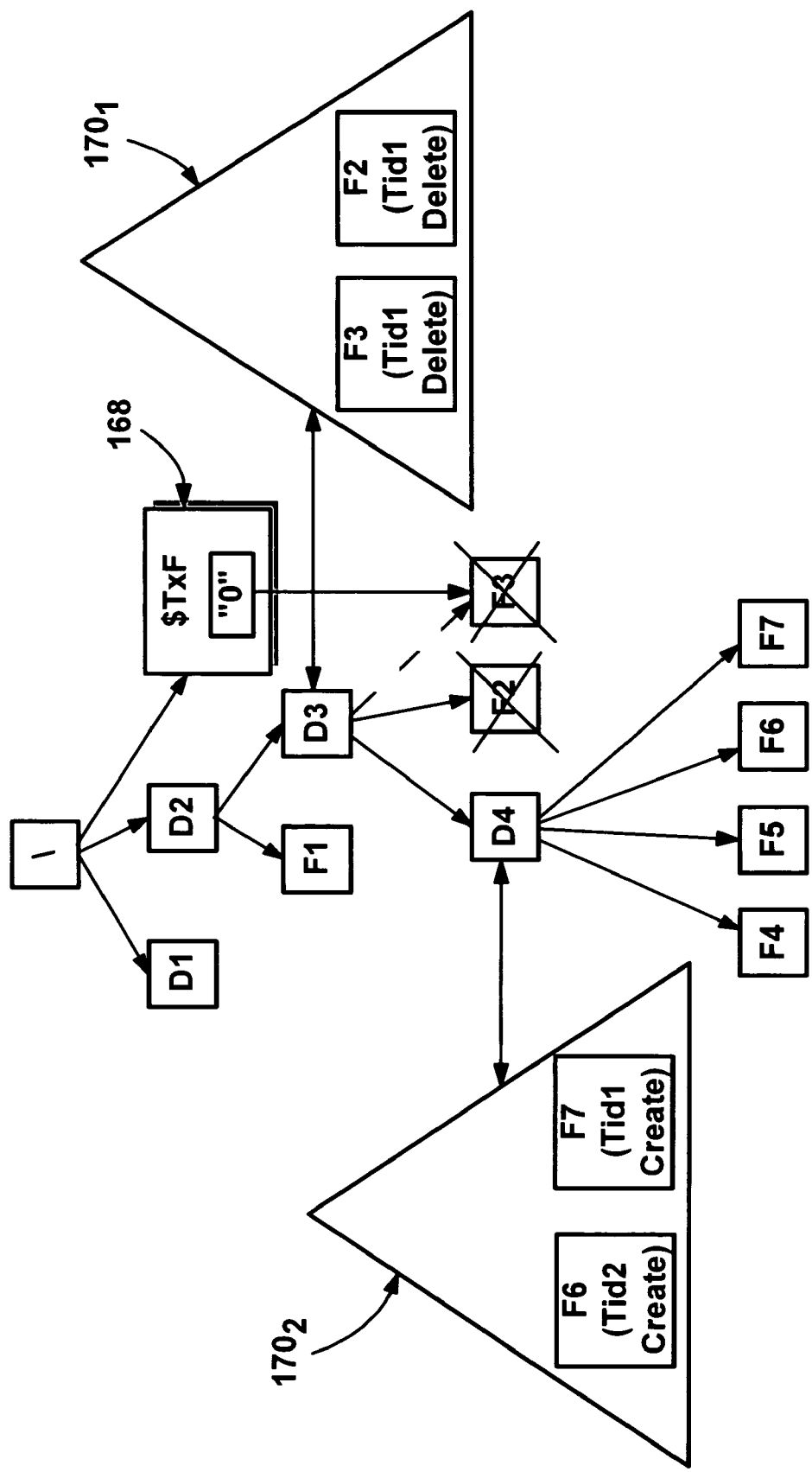

To accomplish namespace isolation to handle the above-described scenarios, the present invention preserves the state of the namespace for use by the other transactions for the duration of the transaction. To this end, as shown in FIGS. 16-18, separate directories known as isolation directories $170_1$-$170_4$ are created and linked to the respective NTFS directories that are changed by the transaction performing the namespace operation. More particularly, each isolation directory (e.g., $170_1$) comprises a search structure (e.g., a binary search tree) associated with a parent directory's (e.g., directory D3) TxFSCB structure. Further, the isolation directory search structures and associated manipulation routines include general interfaces that support addition of an entry, fast look-up of an entry with a name, and also supports directory enumeration algorithms.

These isolation directories include the individual names affected by the transactions that have made namespace changes, and are main-memory structures only. Each entry in the structure also includes the transaction ID (Tid) associated with the name, and a visibility disposition which has two flags, visible to the transaction Tid, or visible to the others. One, or both of these visibility flags may be set independently. The isolation directory structure also includes a ShortName/LongName flag, wherein if a pairing is available, the structure includes a pointer to the structure corresponding to the paired name. Also provided is a flag indicating that the name is reserved by the Tid, and others cannot claim it, a Fid (used to redirect create( ) for deleted and renamed names), and other information, i.e., NTFS duplicated information such as timestamps and the like used for directory enumeration. For space efficiency, the structure may be separated into a Name, a pointer to the information, a Pointer to the other name, and the other information. This results in a single set of the other information being shared by the two names.

By way of example of how the isolation directory is used, if a file F3 is deleted by a transaction T1, as represented in FIG. 16, the name and various information of the file F3 is added to the isolation directory $170_1$ at (essentially) the same time that the name is removed from the NTFS directory D3. Note that to delete a file in NTFS, an open file is marked for delete, the file system closes the file while maintaining a count of the open handles, and performs the delete when no handles remain open. Further note that the isolation directory $170_1$ may already exist from an earlier operation by this transaction T1 or another transaction (e.g., T2), or may be created if needed to support this delete operation. The delete operation is further described below with reference to the flow diagram of FIG. 19.

A subsequent access to this file F3 by a different transaction (e.g., T2) is serviced using the isolation directory $170_1$, whereby the transaction T2 will continue to see the file F3. However, if the same transaction T1 that deleted the file F3 (or a non-transaction) looks for the file F3, it will not find it. To handle these situations, as described above, the name of the file, its visibility disposition, the ID of the transaction that deleted the file, a redirect file ID, the $TxF file identifier (e.g., a monotonically increasing sequence number) and the duplicated information (datestamp, size, attributes) are maintained for the file.

Figure 19:
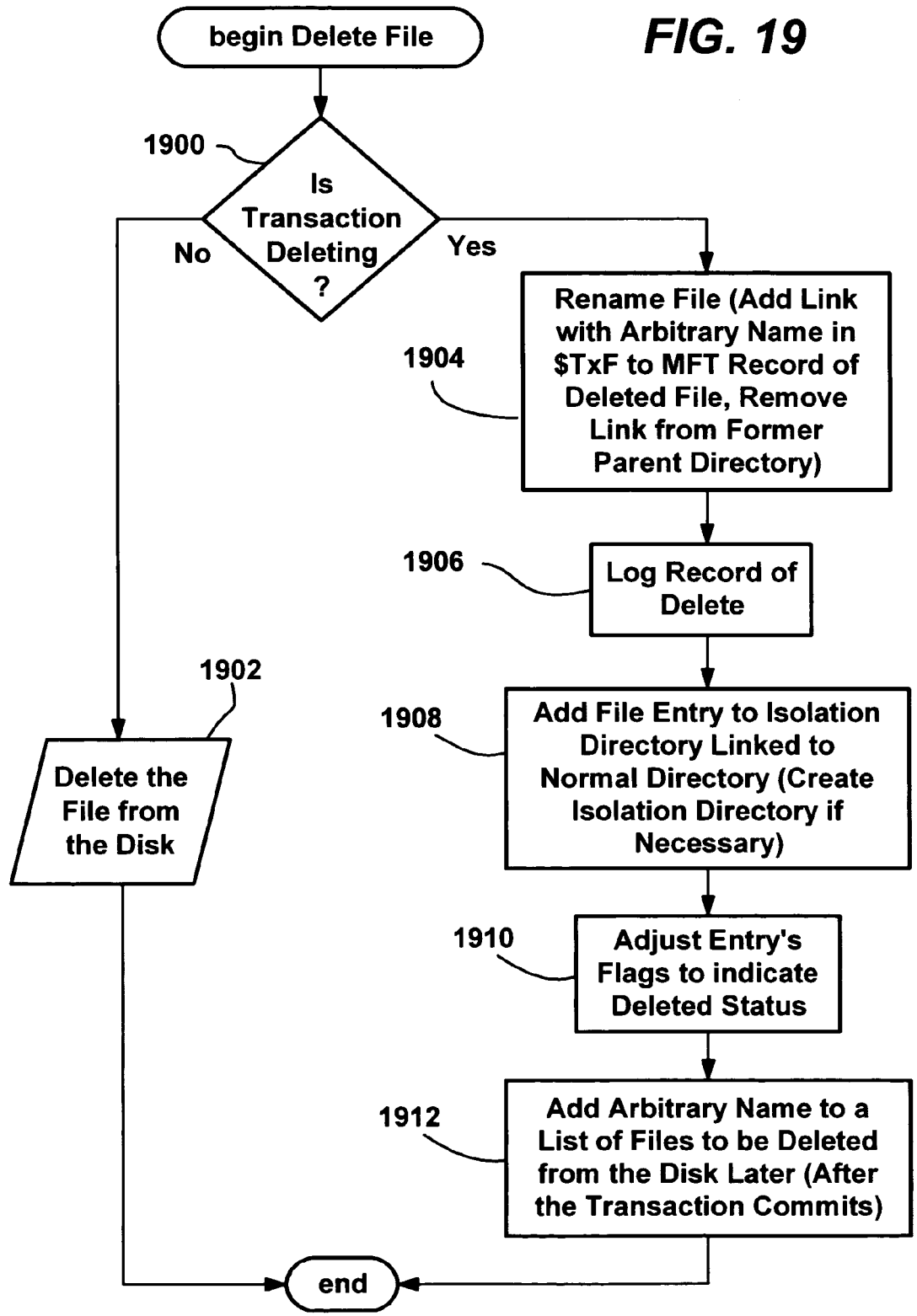
FIGS. 19-22 are flow diagrams representing general rules for the use of isolation directories for providing namespace isolation in accordance with one aspect of the present invention.

FIG. 19 provides a representation of the general logic for handling a request for the deletion of a file that is opened. Note that FIG. 19 and similar flow diagrams are simplified for providing an understanding of how the isolation directories are used, and should not be considered a precise representation of the underlying code, e.g., special cases, error handling and so forth are not included. In any event, beginning at step 1900, a distinction is made between transacted and non-transacted requesting entities, since transacted users will result in operations that are different from a delete operation of a non-transacted user. If a non-transaction is requesting deletion of a file (identified by its handle), the deletion is performed in an otherwise normal manner, i.e., at step 1902 the specified file is deleted from the disk. Deletion will start when the last handle is closed.

If a transaction (e.g., Tid1) is requesting deletion at step 1900, then step 1904 is executed, which essentially renames the file. For example, as generally represented in FIG. 16, a link with an arbitrary name (e.g., "0") is added to a hidden directory 168 ($TxF), which links to the file's record in the master file table 130 (FIG. 11). At the same time, the link from the deleted file F3 is removed from the parent directory D3.

The delete information is then logged at step 1906 in a delete record, i.e., the filename F3, the reference for the original parent and the new link information. If the system crashes before the transaction that is deleting the file commits, the transaction will abort, and the log will correctly restore the file by simply renaming it as described above, i.e., by restoring the former link (the $TxF directory will be gone since it is an in-memory structure).

In keeping with the present invention, the file information is then added to an isolation directory tree $170_1$ linked to the normal directory D3. The isolation directory tree 170₁ may already exist in association with the normal directory, but if not, it is created. Step 1910 is executed to appropriately adjust the visibility disposition flags to indicate that transaction Tid1 has requested deletion of this file so that this file is still visible to other transactions, but not to Tid1. At step 1912, the arbitrarily named link is added to a list of files to be deleted from the disk later (i.e., after the transaction commits).

The name entries corresponding to a transaction are removed from the isolation directory when that transaction ends, and the isolation directory may be deleted when no entries remain therein. Note that if the system crashes, the isolation directories, which are in-memory structures, are lost. However, since the crash aborts non-committed transactions, the isolation directories are no longer needed for isolation, and the unrolling of the log file resets the state of the files appropriately.

Creation of a file is somewhat similar to deletion, in that when a file is created in a directory by a transaction (e.g., Tid2), the name is actually added to the isolation directory linked to the (parent) NTFS directory. For the other transactions, the name is filtered out by the visibility flags' settings for the purposes of opening the file or when listing the parent NTFS directory until the transaction commits. For Tid2 and non-transactions, the created file is visible before it is committed.

The named entries may be modified by the transaction after they are added. For example, if a file is deleted and another file is created using the same name, the creation will modify the state of the entry such that the other transactions will continue to see the file that existed before the delete, but this transaction will see the new file it just created. Note that no transaction level locks are held on NTFS or isolation directories. This allows the system to be no less concurrent that the base file-system.

As represented in FIG. 18, if a file F6 is created by transaction Tid2 (the creation is requested in a normal parent directory D4), then F6 is created in directory D4 and an entry therefor added to an isolation directory 170₂ associated with the parent directory D4. The isolation directory 170₂ is created if necessary. The flags are appropriately adjusted to reflect Tid2's create status, i.e., visible to Tid2 but not to other transactions, and the name reserved for Tid2. Note that the transaction Tid2 can also delete the newly created file F6 before Tid2 commits, in which event it will not be visible to Tid2 or others. One way to handle such a create-then-delete operation is to remove the entry from the directory D4 and the entry from the isolation directory 170₂. Another way is to leave the entry in the isolation directory 170₂ with its disposition flags set to invisible to both the creating Tid2 and to others, which prevents the file name from being used by others until Tid2 commits or aborts.

Returning to the typical situation in which F6 is created by the transaction Tid2 but not deleted, when (and if) the transaction Tid2 commits or aborts, the isolation entry is removed from the isolation directory 170₂ thus making the created file F6 visible to everyone in the case of commit. If the transaction T2 aborts, the file is deleted from the normal NTFS directory D4. Each isolation entry remains until the end of its associated transaction, and is removed at the time of commit or abort. To facilitate removal, each transaction maintains a list of TxFSCB pointers where that transaction has at least one such entry. The transaction also appropriately increments and decrements a reference counter on each of the TxFSCBs so that TxFSCBs are kept around by the transactions using them.

Figure 20:
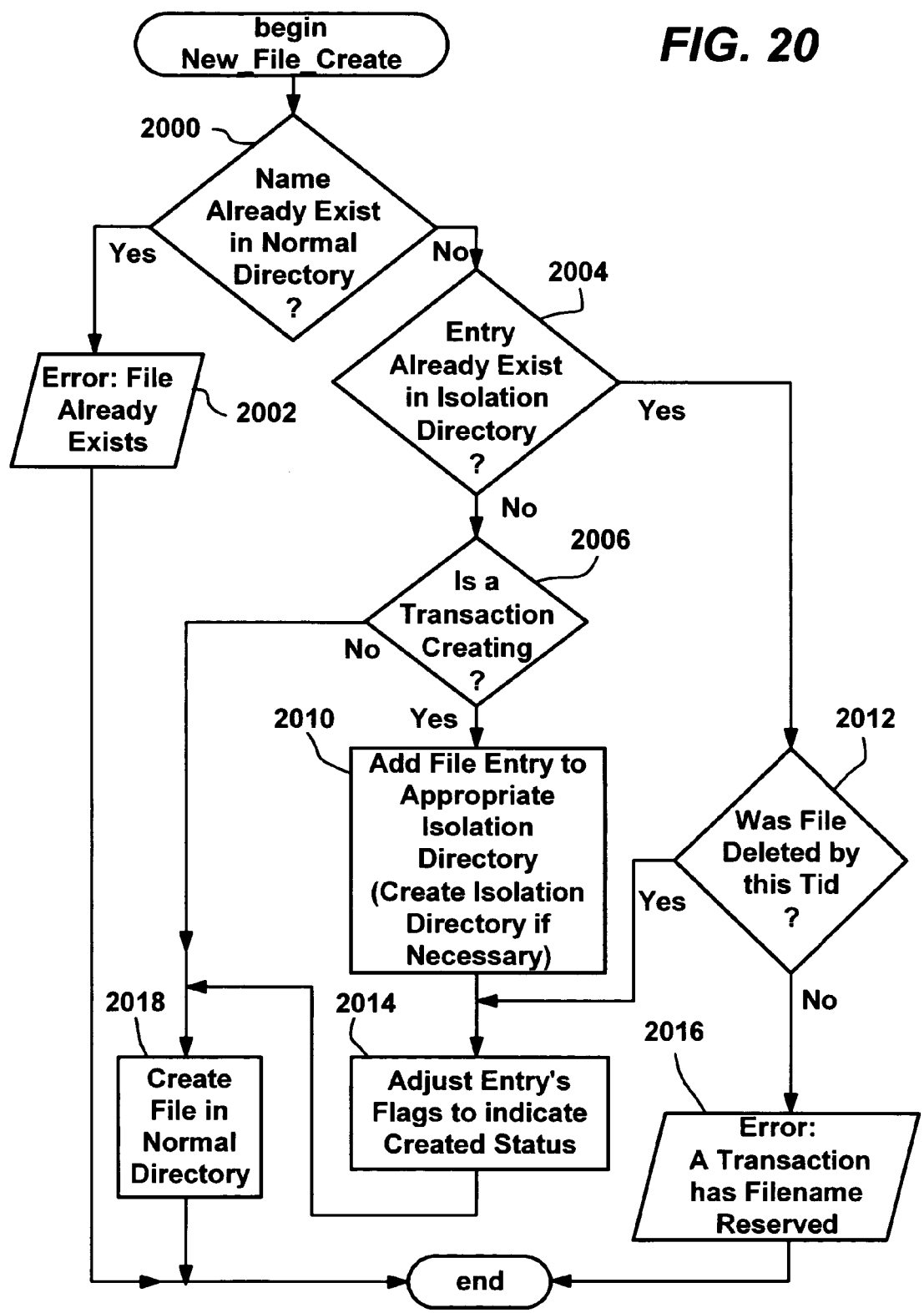

FIG. 20 provides a representation of the general logic for handling a request for the creation of a file, wherein the request is a New_File_Create (e.g., of the type wherein the creation is not allowed if a file with the same filename already exists). Beginning at step 2000, a test is performed to determine if the filename (e.g., F6 of FIG. 17) is already present in the normal parent directory, e.g., the parent directory D4. If so, the file cannot be created, and step 2000 branches to step 2002 where an error is returned. If the file F6 is not found in the parent directory D4, there is a possibility that the filename is already in use by a transaction. To test for this, step 2000 branches to step 2004 wherein the isolation directory 170₂ associated with D4 is searched for this filename. If an entry for this file F6 (or the isolation directory) does not exist, step 2004 branches to step 2006 wherein a determination is made as to whether a transaction is requesting creation, or a non-transaction. If a non-transaction is requesting, step 2006 branches to step 2018 wherein the file is created in the normal directory D4. Otherwise, a transaction (e.g., Tid2) is requesting creation, and step 2010 is executed to add an entry therefor to the isolation directory 170₂ (after creating the isolation directory 170₂ if none already exists for the parent directory D4). Step 2014 then represents the setting of the appropriate flags, obtaining of the other information and so forth for this entry. Step 2014 then continues to step 2018 wherein the file F6 is actually created in the normal directory D4. Note that in NTFS, when created, the file is allocated, a file record is created in the master file table for the file, and a create record is added to the log.

If the name is found in the isolation directory 170₂ at step 2004, then the creation not allowed unless the specified file was deleted by the same Tid (e.g., Tid2) that is now requesting creation. In this manner, a transaction may create files that it deleted, but no other transaction or non-transaction may use the filename until the transaction that created and/or deleted the file commits or aborts. If found, step 2012 is executed to test the flag status to determine whether the same transaction is now requesting creation. If so, step 2012 branches to step 2014 to change the flags' status for this entry, essentially now representing "created by Tid2" (visible to Tid2, invisible to others) instead of "deleted by Tid2" (invisible to Tid2, possibly visible to others). If another transaction or non-transaction is requesting creation, step 2012 branches to step 2016 to return an error indicating that a transaction has this file name reserved.

FIG. 18 represents a transactional file renaming operation, which is essentially a create link request and a delete link request combined. Thus, if the transaction T1 renames the file "\D2\D3\F2" to "\D2\D3\D4\F7," then the link F2 is deleted from directory D3 and the link F7 created in directory D4. However, because a transaction is involved in the rename, the operations are reflected in the appropriate isolation directories 170₃ and 170₄. Note that a file may be renamed within the same parent directory, or renamed such that file has the same filename, but in a different directory.

In keeping with the present invention, for a transactional rename of a file, an isolation directory on each parent directory involved in the rename is provided, e.g., one to indicate the transaction's delete operation, and one to indicate the transaction's create operation. Note that a rename within the same parent directory will only require one isolation directory, with one entry for the delete of the old file and one for the creation of the new file. As can be understood from FIGS. 19 (delete) and 20 (create) described above, other transactions will still see the file as if it was not renamed, and will not see the renamed file, until the transaction commits. If the transaction aborts, the other transactions will not see anything to indicate that the rename ever occurred, other than potentially seeing that the filenames in use are temporarily reserved during the life of the transaction.

Figure 21:
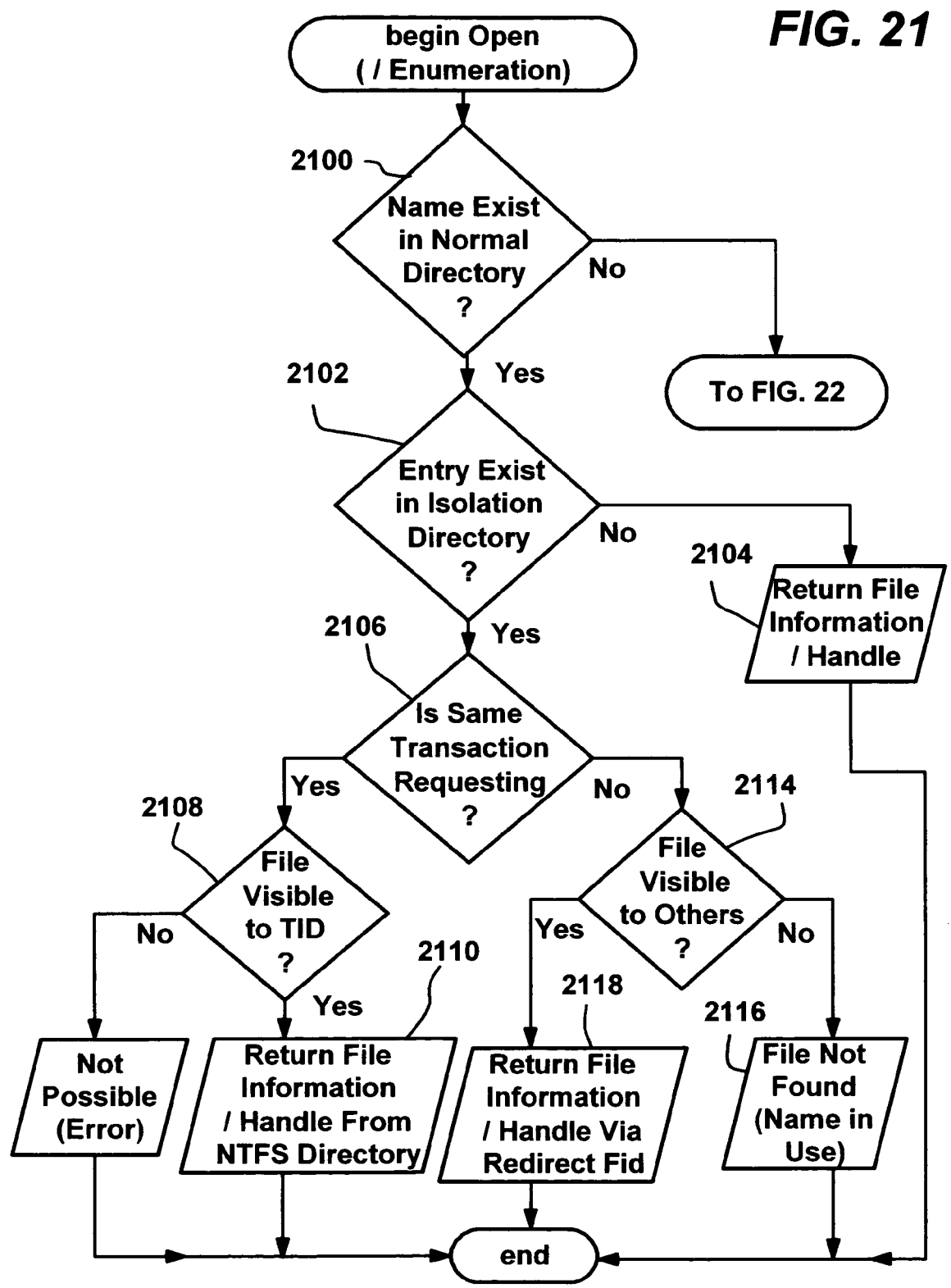
Figure 22:
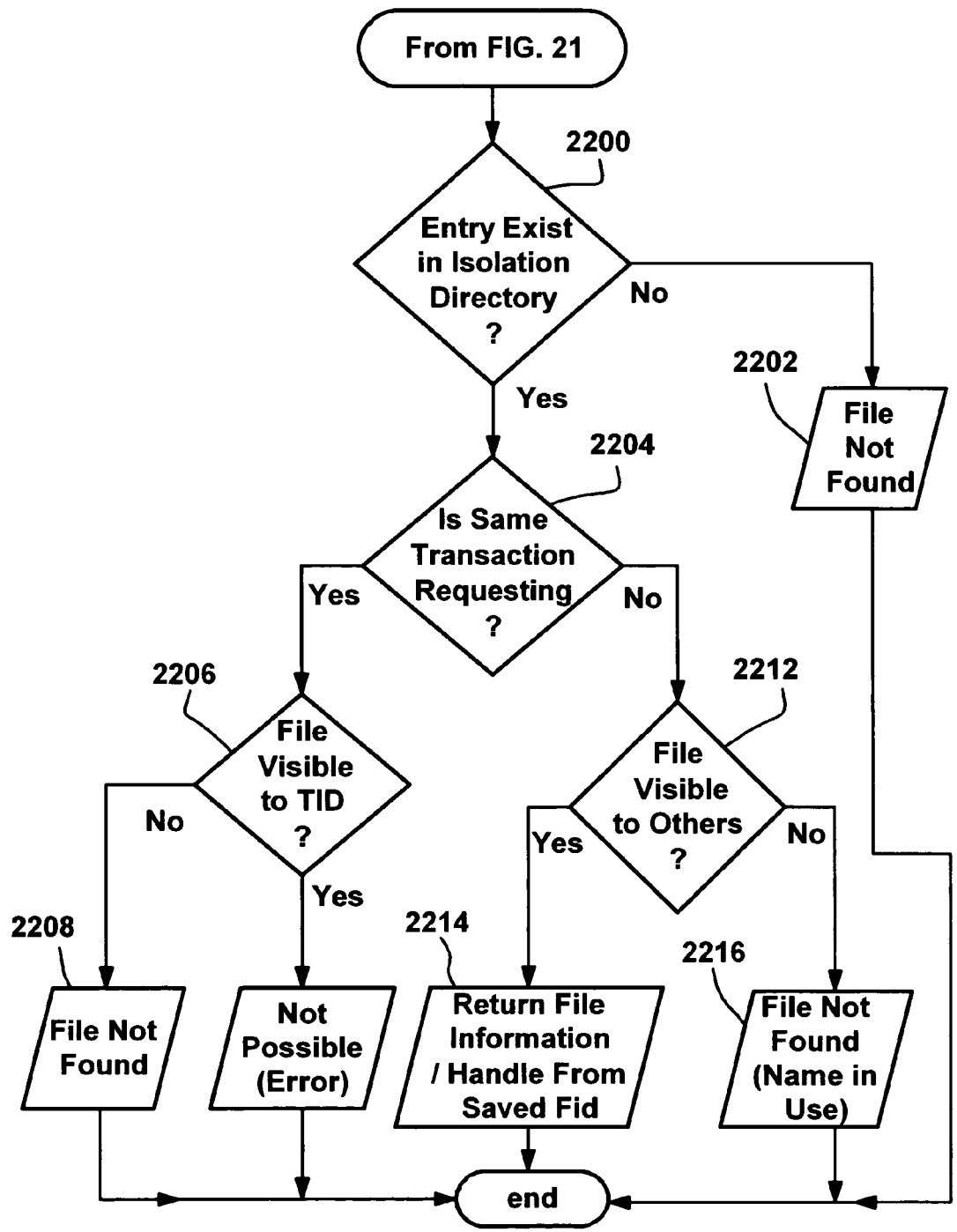

Lastly, FIGS. 21-22 represent whether a transaction will see a specified file or not, such as when attempting to open a file or obtain its file information (e.g., as part of an enumeration), depending on the state of the file. Step 2100 represents testing whether a file is in the normal parent directory. If so, the isolation directory, if any, needs to be searched for an entry for the file to determine whether the file is visible to the requester (step 2102). If not in the normal directory, there is a possibility that the file was deleted from the normal directory by an ongoing transaction, which is handled in FIG. 22 below.

If the file is in the normal directory (step 2100) and an entry for the file is not in the isolation directory at step 2102, then it is an ordinarily accessible file, i.e., one that has not been created by a transaction that has not yet committed. If so, the file system operates (as represented by step 2104) as it has before transactions, i.e., a file handle may be returned, (e.g., in the case of a file open request), or the file information may be returned from information in the master file table (e.g., in the case of an enumeration request).

If an entry for the file is in the isolation directory tree, it has to have been created by an ongoing transaction, and step 2102 instead branches to step 2106 where a test is performed to determine if the transaction that created the file is the same transaction that is now requesting access or information therefor. If so, step 2106 branches to step 2108 where the visibility disposition flag (whether visible to this Tid) may be tested. If visible, then the file handle (or file information) is returned to the requesting transaction (step 2110). Note that in the present implementation, there should not be a situation wherein a file is in the normal directory, and an entry therefor in the isolation directory, (because of creation by a transaction), but the flag indicates that the file should not be visible to the transaction that created it. Thus, in the present implementation, the test at step 2108 is essentially unnecessary unless used to detect corruption or the like of the normal and/or isolation directories.

If an entry for the file is in the normal directory (step 2100) and in the isolation directory tree (step 2102), but step 2106 determines that the same transaction is not making the request, then in the present implementation, the file may or may not be visible to others at step 2114. If not visible, step 2116 then treats the file as not found, except that if as part of the request the other transaction is requesting to use the filename, an error indicating that the file is in use by another transaction will be returned. For example, an open file request of the type that attempts to create a new file if the specified file is not found will fail because the name is in use. If visible to others at step 2114, (the file was created after it was deleted), the redirect Fid is used to open the deleted file from the $TxF directory (step 2118).

FIG. 22 handles the situation wherein a file is not in the normal directory. If a transaction that has not yet committed or aborted has deleted the file, an entry for the file will be in the isolation directory, whereby that transaction cannot see the file, but others can. Step 2200 tests for whether an entry for the file is not in the isolation directory (and not in the normal directory via step 2100 of FIG. 21), whereby if not, the file is not found at step 2202 and treated accordingly.

If instead at step 2200 the name is present in the isolation directory, then a transaction has deleted it. Step 2204 tests whether the same transaction that deleted the file is requesting access to (or information for) that file. If so, the file is not visible at step 2206 to the transaction that deleted it, and thus a not found state (step 2206) exists. Note that if for some reason the file was visible to the transaction, an error would exist.

If at step 2204 a different transaction from the one that deleted the file is requesting access to (or information for) that file. If the file is visible to others as tested by then step 2212, the step 2214 returns a handle, or the file information (from the saved File ID, or Fid as described below, including duplicated information) for that file.

One other possibility is that an ongoing transaction has created and then deleted a file, whereby the file is not in the normal directory. As described above, the filename can either be treated as available to others, or reserved to the ongoing transaction until that transaction either commits or aborts. The former may be accomplished by simply removing the entry for the file from both the normal directory and the isolation directory when the transaction that created it deletes it; note that if such a file entry is removed from the isolation directory, then step 2212 will not be reached. The latter may be accomplished by removing the file from the normal directory while leaving the entry for the file in the isolation directory upon deletion, and setting the flags to indicate not visible to anyone. As can be appreciated, this is possible because the visibility disposition flags are independently set (i.e., they are not mutually exclusive). However, if the file is left in the isolation directory and marked not visible to others (as well as to the transaction that created it), then at step 2216 a file not found state exists, however the filename reserved to the ongoing transaction.

In this manner, the present invention facilitates a collated search, e.g., find the next name in the collated order, using NTFS collation rules and NTFS routines. The present invention is space efficient, and allows concurrent read/write access.

Note that for purposes of what it sees or does not see, a non-transaction simply sees what is in the normal directory. However, for purposes of using an existing filename, a non-transaction cannot use a name reserved to a transaction. To this end, the isolation directory is checked as described above when a non-transaction attempts to create a file having a name that does not exist in the normal directory.

In view of the above examples and descriptions, the following examples show how transactions use and modify the entries in the isolation directories. First, consider a transaction Tid10 creating a new file named YisAVeryLongName in directory X, i.e., creation of X\YisAVeryLongName. The isolation directory gets the following two entries added:
Name:YisAVeryLongName;
Tid:10;
(Visible to Tid:TRUE, Visible to others:FALSE);
LongName:TRUE;
pairedNamePtr: Ptr to shortname entry;
Reserved: TRUE;
Fid: INVALID_ID;
Other duplicated info.
Name:YisAVery;
LongName: FALSE;
pairedNamePtr: Ptr to long-name entry.

This ensures that a subsequent directory enumeration of X will not return either of these names if it is done by a transaction other than Tid10, while non-transactions will get to see the two names. Further, if another transaction. Tid20 attempts to create or open either of the two names, that transaction will get a "File-already-exists-but-sharing-violation" error, detected from the above isolation structure.

If a non-transacted thread opens either of the names, it will get a sharing violation if it opens for writing, for deleting or for any sort of modification. Such a non-transaction will be able to open it read only. This is due to the file-locking semantics of TxF, separately enforced as described above.

Consider a second example, the transacted deletion of an existing file YisAVeryLongName from parent directory X. In this example, there is a short name link as well in directory X for this name (name-pair case, as opposed to a link deletion case). Again, the transaction has the identifier Tid10, whereby the isolation directory has the following two entries added:
Name: YisAVeryLongName;
Tid:10;
(Visible to Tid:FALSE, Visible to others:TRUE);
LongName:TRUE;
pairedNamePtr: Ptr to shortname entry;
Reserved: TRUE;
Fid: The File Id;
Other duplicated info.
Name: YisAVery;
LongName: FALSE;
pairedNamePtr: Ptr to long-name entry.

The two links will also be deleted from the index SCB of directory X, although for now it may be assumed that TxF ensures that the file doesn't get physically removed, because TxF adds a system-owned link to the file before the deletion. As a result, neither of the two names can be used by anyone other than Tid10 for creating new files or linking. This is because Tid10 can decide to abort and reclaim the names. Also, these names are not visible to Tid10 in directory enumeration or in Create, which enables Tid10 may create new links/files with either of the two names. These names are visible to other transactions, which means they can open them using the file ID (Fid). Non-transacted users cannot see these files, yet they cannot use these names for new creations.

In a third example, consider that the first example has previously happened, i.e., the file has been created. Then, since the name is visible to the transaction Tid10, Tid10 is free to open the file and delete it as well Tid10. If Tid10 thus opens the file for writing, and later deletes it, the isolation entries after the deletion appear as below:
Name: YisAVeryLongName;
Tid:10;
(Visible to Tid:FALSE, Visible to others:FALSE);
LongName:TRUE;
pairedNamePtr: Ptr to shortname entry;
Reserved: TRUE;
Fid: INVALID_ID;
No duplicated info.
Name: YisAVery;
LongName: FALSE;
pairedNamePtr: Ptr to long-name entry.

These entries reserve the name for the transaction, but make it invisible to everyone. Note that the reservation is performed to allow a rollback to work.

Floated Memory Mapped Sections

Another aspect of the present invention is directed to solving a problem wherein an application is performing memory mapping on one or more files open for write access, and does not become aware that a transaction of which the application is part of has aborted (or committed). This can occur, for example, when a distributed transaction aborts on another node network node. An application may also be behaving improperly or maliciously at such a time.

When an application is performing memory mapping on a file open for write access, and is unaware that its associated transaction has aborted (or committed), and/or is behaving improperly or maliciously, another writer can open the still-memory-mapped file for write access. As a result, a conflict can occur with the file data, as multiple simultaneous writers may exist. More particularly, when performed by an application, memory mapping refers to using section objects (a block of shared memory) to map a file into a process address space. If the application modifies a page, the memory manager may write the changes back to the file on disk during normal paging operations, or the application can directly cause a flush. While not desirable in transactional environments, applications are allowed to perform memory mapping, and thus have the potential to cause a write to a file that is opened for write access by another transactional application.

The file system, which knows when a transaction commits or aborts, and for example, is cleaning up the data structures affected by that transaction, can query the memory manager to determine whether an transaction's application process (or processes) are memory mapping, i.e., have created a section handle. If any such applications exist, the file system, which does not know the operating state of the application, cannot directly shut down the application or ensure that it will not continue to write to mapped sections.

Figure 23:
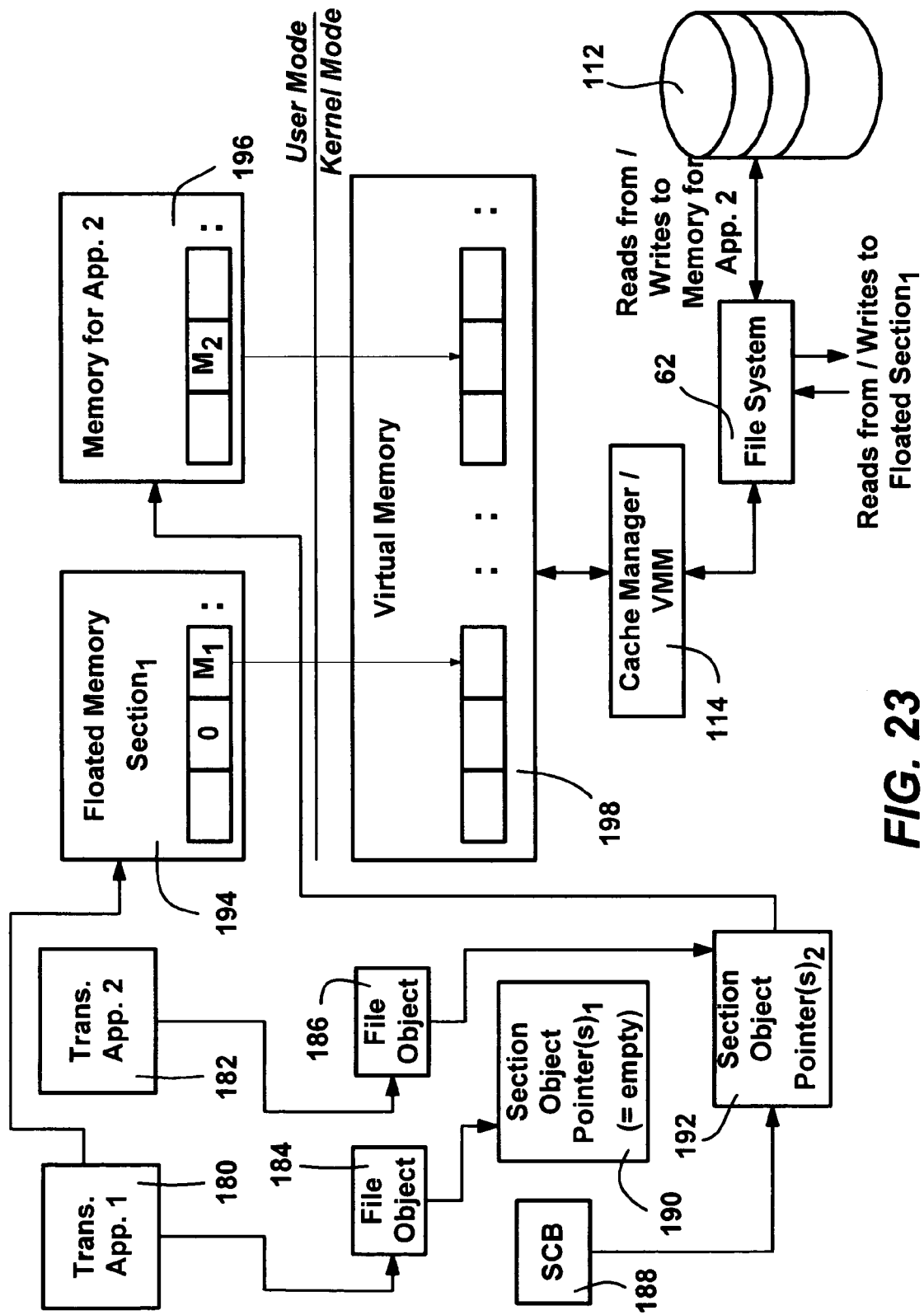
FIG. 23 is a block diagram representing the floating of a memory mapped section in accordance with one aspect of the present invention.

FIG. 23 shows one way in which the file system 62 prevents an application 180 (that is no longer part of a transaction) from writing to a mapped file that now is open for write access by another application 182. To this end, the file system adjusts the section control block (SCB) 188 so that the file objects 184, 186 of the respective applications 180, 182 point to distinct section object pointers 190, 192. The section object pointer 190 for the invalid transactional application 1 (180) is empty, while the section object pointer 192 for the valid transactional application 2 (182) has a pointer to the memory 196 for that application 182. This makes the memory section 194 floated.

The invalid transactional application 180 can continue to read from or write to the floated memory section 194, but it no longer corresponds to the file. At the same time, whenever a page is faulted in by the cache/memory manager 114 via the file system 62 on behalf of the valid application 182, the appropriate virtual memory pages 198 (and thus the memory 196 used by the application 182) are filled with data from the transactionally correct file, e.g., the correct page as maintained in the TOPS stream version, or from the file on disk, as appropriate. The file system 62 similarly writes pages that are changed by the valid application to the disk 112 as instructed by the memory manager 114.

However, for the pages in the section mapped to the invalid application 180, any write requests from the memory manager 114 that reach the file system 62 corresponding to the memory section 194 are accepted by the file system 62, but not actually written to disk. As a result, the mapped memory is a floated section; it is allowed to be written to in memory, but the changes are never flushed to disk. Requests to fault in pages from the disk 112 by the memory manager 114 result in zeros being returned thereto. As a result, this version of the section 194 is no longer backed by the file on disk. In this manner, the file data of a valid transactional application is isolated from the data changes made to a mapped file by an invalid application.

It is alternatively possible to change the mapped section of memory to no access or read-only to the invalid application, whereby a write thereto by the invalid application will cause an access violation. If reads are allowed, the invalid application may see any changes made by the valid application whenever such changes are faulted into the section 194.

Note that any of the above solutions may cause the invalid application 180 to crash, however the data of the valid application 182 is properly isolated. To avoid crashing the invalid application 180, changes made thereby may be written to another file on the disk, however at present, supporting such post-transaction versions has been deemed unnecessarily costly for such applications.

As can be seen from the foregoing detailed description, there is provided a transactional file system and method that enables applications to easily perform multiple transactional operations to one or more files. Multiple file system operations are tied together in a transactional manner within the file system, such that the operations either are committed together, else any partial actions are undone. Moreover, the operations and data changes of one transaction are isolated from the operations and data of another transaction. Thus, for example, the present invention is capable of updating a website as a single transaction handled by the file system component, in a manner that is rapid, efficient, and safe. At the same time, the in progress changes are isolated from others until the transaction commits.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing environment, a computer-implemented method for isolating changes to a file in a transactional file system when the file is being opened by multiple, concurrent transactions, the method comprising:

receiving a first request to open the file, the request associated with a first transaction;

opening a first instance of the file, and maintaining information indicating that the first instance of the file is associated with the first transaction;

receiving a second request to open the file, wherein the second request is received subsequent to the first request and is associated with a second transaction which is unassociated with the transaction of the first request;

opening a second instance of the file in response to the second request, and maintaining information indicating that the second instance of the file is associated with the second transaction;

maintaining data to isolate a first version of the file corresponding to the first instance from a second version of the file corresponding to the second instance;

receiving a change to data of the second instance of the file;

in response to receiving a change to the data of the second instance of the file, writing a change to the file and preserving a copy of a portion of the first version of the file to a first data structure prior to writing the change to the file; the first data structure being associated with the data isolating with the first version of the file from the second version of the file;

receiving a read request to read the file subsequent to the second request to open the file, the read request associated with the first transaction;

determining that the first version of the file is associated with the first transaction; and reading data corresponding to the first version of the file rather than reading data corresponding to the second version of the file that is associated with the second transaction in response to the read request associated with the first transaction.

2. The method of claim 1 wherein maintaining data to isolate the first version of the file from the second version of the file includes maintaining the change to the data of the second version of the file distinct from data of the first version of the file.

3. The method of claim 2 wherein maintaining data to isolate the first version of the file from the second version of the file includes maintaining a second data structure to map a location of the copy of the portion.

4. The method of claim 3 wherein the portion corresponds to at least one page, and wherein the second data structure records each page number corresponding to a change.

5. The method of claim 3 wherein reading data corresponding to the first version of the file in response to the read request includes accessing the second data structure to determine at least one location of the file data in the first data structure corresponding to the read request.

6. The method of claim 3 further comprising logging information corresponding to the change to the data to a record in a log, and wherein the second data structure further includes information identifying the record.

7. The method of claim 1 wherein the first request to open the file corresponds to a read-only request.

8. The method of claim 1 further comprising, receiving a close request to close the file, the close request associated with the first transaction, closing the file with respect to the first transaction, receiving a third request to open the file, the third request associated with the first transaction, receiving a request to access data in the file from the first transaction, and accessing data in the file corresponding to the second version in response to the request to access data.

9. A computer-readable storage medium having computer-executable instructions stored thereon, which when executed perform the method of claim 1.

10. In a computing environment, a computer-implemented method for isolating changes to a file in a transactional file system when the file is opened by a transaction and subsequently modified by a request unassociated with the transaction, the method comprising:

receiving a first request to open a file, the first request associated with the transaction;

opening a first instance of the file, and maintaining information indicating that the first instance of the file is associated with the transaction;

receiving a second request to open the file, wherein the second request is received subsequent to the first request and is not associated with the transaction, the second request being a read/write request occurring concurrently with the first transaction;

opening a second instance of the file in response to the second request;

receiving a change to data of the second instance of the file;

maintaining data to isolate a first version of the file corresponding to the first instance from a second version of the file corresponding to the second instance;

receiving a read request to read the file subsequent to the second request to open the file, the read request associated with the transaction and occurring while the file is opened in response to the first request to open the file;

determining that the first version of the file is associated with the transaction;

reading data corresponding to the first version of the file rather than reading data corresponding to the second in response to the read request associated with the first transaction, including if the second request is associated with a second transaction that has committed;

receiving a request to close the file, the close request being associated with the first transaction;

closing the file with respect to the first transaction;

receiving a read request to read the file subsequent to the request to close the file, the read request being associated with the first transaction; and reading data corresponding to the second version of the file, unless the second request is associated with a second transaction that has not committed, in which case data corresponding to the first version of the file is read.

* * * * *